US006844523B2

(12) United States Patent
Yamazaki et al.

(10) Patent No.: US 6,844,523 B2
(45) Date of Patent: Jan. 18, 2005

(54) LASER APPARATUS, LASER IRRADIATION METHOD, MANUFACTURING METHOD FOR A SEMICONDUCTOR DEVICE, SEMICONDUCTOR DEVICE AND ELECTRONIC EQUIPMENT

(75) Inventors: Shunpei Yamazaki, Tokyo (JP); Koichiro Tanaka, Kanagawa (JP); Hidekazu Miyairi, Kanagawa (JP); Aiko Shiga, Kanagawa (JP); Akihisa Shimomura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 119 days.

(21) Appl. No.: 10/235,942

(22) Filed: Sep. 6, 2002

(65) Prior Publication Data

US 2003/0080100 A1 May 1, 2003

(30) Foreign Application Priority Data

Sep. 7, 2001 (JP) ........................................ 2001-272751
Sep. 10, 2001 (JP) ........................................ 2001-273687

(51) Int. Cl.[7] ............................................... H01L 26/00
(52) U.S. Cl. ............................. 219/121.66; 219/121.66; 219/121.67; 219/121.68; 219/121.69; 219/121.82; 219/121.85
(58) Field of Search ....................... 219/121.66, 121.67, 219/121.68, 121.69, 121.82, 121.85

(56) References Cited

U.S. PATENT DOCUMENTS 5,010,230 A * 4/1991 Uemura ................. 219/121.62
5,138,131 A * 8/1992 Nishikawa et al. ..... 219/121.67
5,227,607 A * 7/1993 Ishiyama ............... 219/121.68
5,372,836 A   12/1994 Imahashi et al.
5,571,430 A * 11/1996 Kawasaki et al. ...... 219/121.78
6,700,096 B2 * 3/2004 Yamazaki et al. ..... 219/121.73
2002/0094008 A1   7/2002 Tanaka

FOREIGN PATENT DOCUMENTS

JP         05-275336          10/1993

OTHER PUBLICATIONS

U.S. application Ser. No. 10/237,172, filed Sep. 9, 2002, (Specification, Claims and Drawings).

* cited by examiner

Primary Examiner—Allan R. Wilson
Assistant Examiner—Edgardo Ortiz
(74) Attorney, Agent, or Firm—Nixon Peabody LLP; Jeffrey L. Costellia

(57) ABSTRACT

To provide a continuous oscillation laser apparatus, and a manufacturing method of a semiconductor device using the continuous oscillation laser apparatus, which can enhance processing efficiency. A laser apparatus according to the present invention includes: a laser oscillation apparatus; a unit for rotating an object to be processed; a unit for moving the object to be processed toward a center of the rotation or toward an outside from the center; and an optical system for processing a laser light outputted from the laser oscillation apparatus and irradiating the processed laser light to a definite region in a moving range of the object to be processed, in which, while the object to be processed is rotated, the object to be processed is moved toward the center of the rotation or toward the outside from the center to move a position where the definite region and the object to be processed overlap.

12 Claims, 25 Drawing Sheets

100 moving direction of the stage 201 during the 1st laser irradiation moving direction of the stage 201 during the 2nd laser irradiation FIG.5A  1st laser irradiation
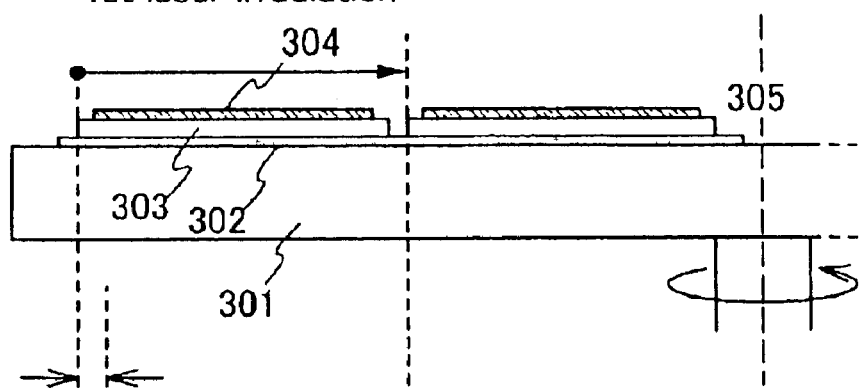
FIG.5B  2nd laser irradiation
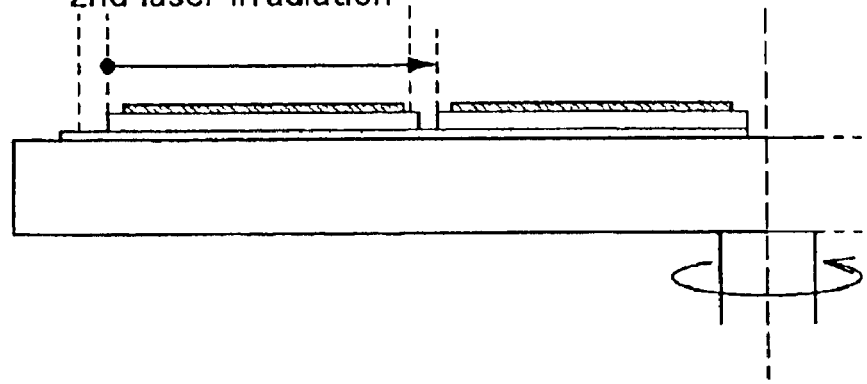

453  450  452  451

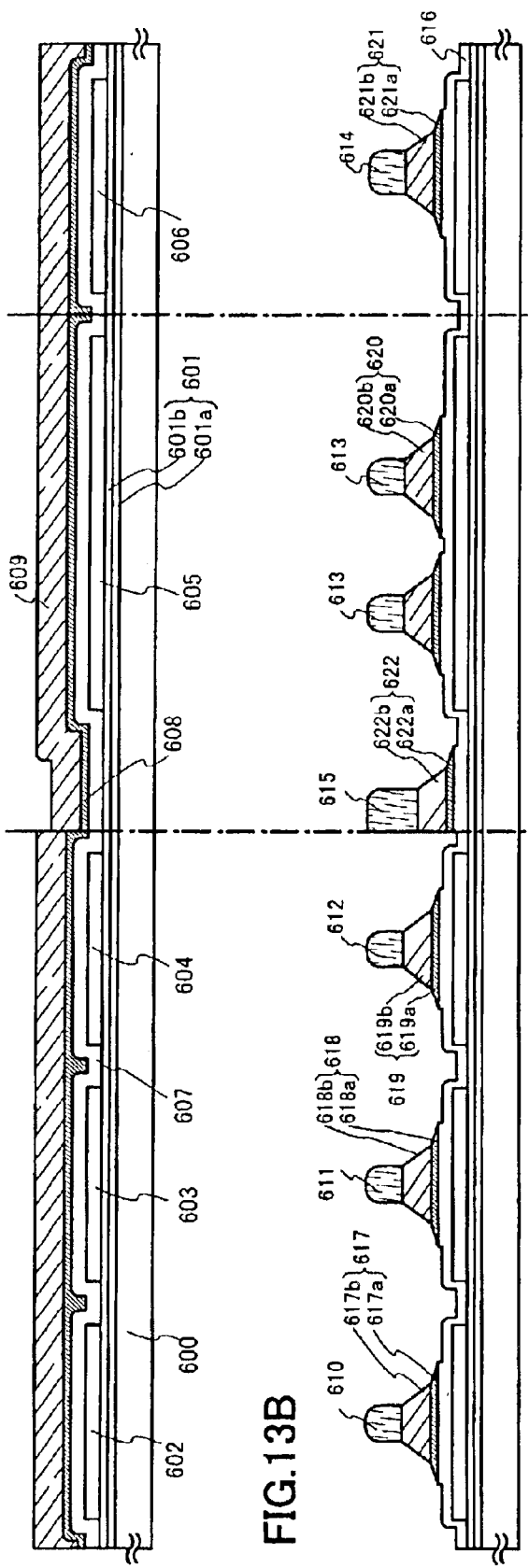
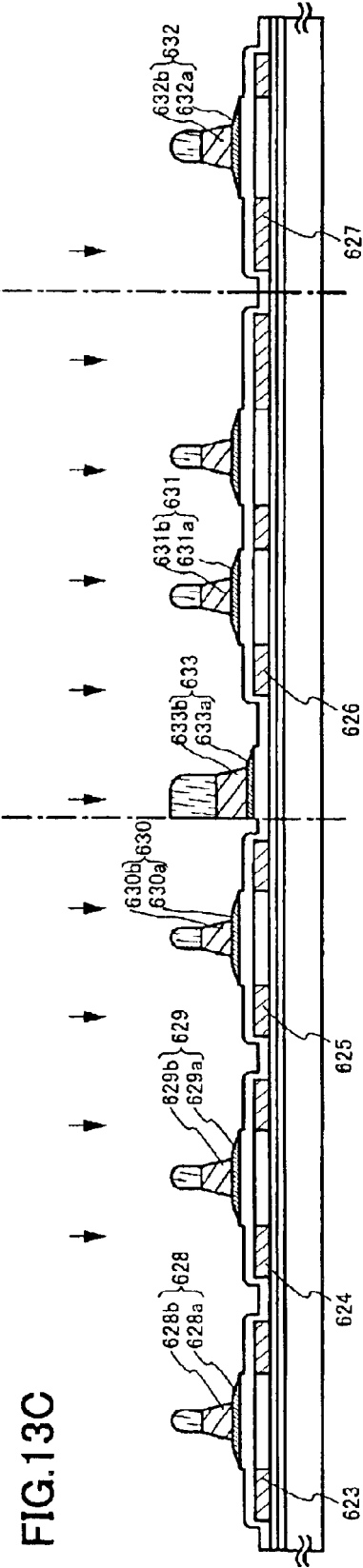
FIG.13A
FIG.13B
FIG.13C

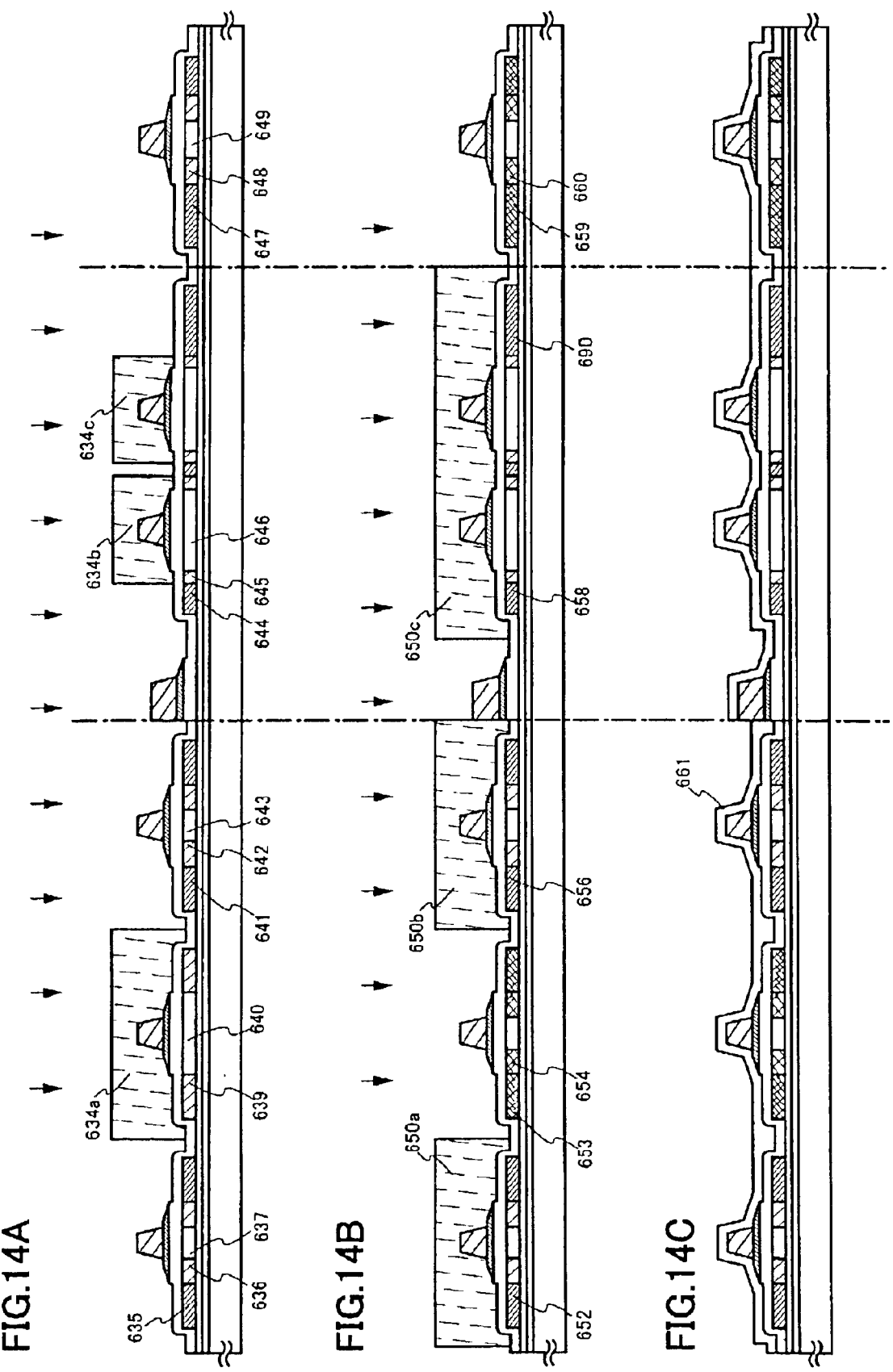

LASER APPARATUS, LASER IRRADIATION METHOD, MANUFACTURING METHOD FOR A SEMICONDUCTOR DEVICE, SEMICONDUCTOR DEVICE AND ELECTRONIC EQUIPMENT

BACKGROUND OF THE INVENTION

1. Field of the Invention

The present invention relates to a laser processing apparatus and a laser irradiation method for crystallizing a semiconductor substrate, a semiconductor film or the like using a laser light or for performing activation after ion implantation, a semiconductor device formed by using the laser apparatus and a manufacturing method therefor, and an electronic equipment using the semiconductor device.

2. Description of the Related Art

In recent years, a technique of forming a TFT on a substrate has greatly progressed, and its application and development for active matrix semiconductor display device has been advanced. In particular, since a TFT using a polysilicon film has higher field-effect mobility than a TFT using a conventional amorphous silicon film, it enables high speed operation. Therefore, although the pixel is conventionally controlled on a driving circuit provided outside the substrate, it is possible to control the pixel on the driving circuit formed on the same substrate.

Incidentally, as the substrate used in the semiconductor device, a glass substrate is regarded as important in comparison with a single crystal silicon substrate in terms of the cost. Since a glass substrate is inferior in heat resistance and is susceptible to heat-deformation, in the case where a polysilicon TFT is formed on the glass substrate, laser annealing is used for crystallization of the semiconductor film in order to avoid heat-deformation of the glass substrate.

Characteristics of laser annealing are as follows: it can greatly reduce a processing time in comparison with an annealing method using radiation heating or conductive heating; and it hardly causes thermal damage to the substrate by selectively and locally heating a semiconductor or the semiconductor film.

Note that the laser annealing method here indicates a technique of recrystallizing the damaged layer formed on the semiconductor substrate or the semiconductor film, and a technique of crystallizing the amorphous semiconductor film formed on the substrate. Also, the laser annealing method here includes a technique applied to leveling or surface reforming of the semiconductor substrate or the semiconductor film. A laser oscillation apparatus applied is a gas laser oscillation apparatus represented by an excimer laser or a solid laser oscillation apparatus represented by a YAG laser. It is known as the apparatus which performs crystallization by heating a surface layer of the semiconductor by irradiation of the laser light in an extremely short period of time of about several ten nanoseconds to several hundred microseconds.

Lasers are roughly divided into two types: pulse oscillation and continuous oscillation, according to an oscillation method. In the pulse oscillation laser, an output energy is relatively high, so that mass productivity can be increased assuming the size of a beam spot to be several $cm^2$ or more. In particular, when the shape of the beam spot is processed using an optical system and made to be a linear shape of 10 cm or more in length, it is possible to efficiently perform irradiation of the laser light to the substrate and further enhance the mass productivity. Therefore, for crystallization of the semiconductor film, the use of a pulse oscillation laser is becoming mainstream.

However, in recent years, in crystallization of the semiconductor film, it is found that grain size of the crystal formed in the semiconductor film is larger in the case where the continuous oscillation laser is used than the case where the pulse oscillation laser is used. When the crystal grain size in the semiconductor film becomes large, the mobility of the TFT formed using the semiconductor film becomes high and variation of the TFT characteristics due to a grain boundary is suppressed. Therefore, a continuous oscillation laser is recently attracting attention.

However, since the maximum output energy of the continuous oscillation laser is generally small in comparison with that of the pulse oscillation laser, the size of the beam spot is small, which is about several $10^{-3}$ $mm^2$. Accordingly, in order to treat one large substrate, it is necessary to move a beam irradiation position on the substrate upward and downward, and right and left.

In order to move the beam irradiation position upward and downward, and right and left, there are a method in which the position of the substrate is fixed and the irradiation direction of the beam is changed, a method in which the irradiation direction of the beam is fixed and the position of the substrate is moved, and a method in which the above two methods are combined with each other.

When the irradiation direction of the beam is changed, the irradiation angle of the beam with respect to the substrate is changed depending on the position to be irradiated. When the irradiation angle is changed, intensity of the beam returning by reflecting on the substrate, intensity of interference, and the like are changed depending on the position of the substrate. Therefore, it is impossible to uniformly treat the substrate. For example, in the case where the semiconductor film is crystallized by laser irradiation, crystallinity causes a difference depending on the position of the substrate.

On the other hand, in the case where the position of the substrate is moved while fixing the irradiation direction of the beam, the irradiation angle of the beam with respect to the substrate is fixed irrespective of the position of the substrate. Accordingly, the above-mentioned problem is avoided and the optical system is further simplified.

However, there is a loss of time according to the direction change that is a problem in moving the substrate.

FIG. 20 shows a direction in which the irradiation position of the beam on the substrate is moved when the irradiation direction of the beam is fixed and the position of the substrate is moved, by an arrow. In general, in the irradiation of the laser light, after moving the irradiation position in a definite direction, the direction is changed and the irradiation position is moved again in the definite direction. At this time, when the moving speed of the irradiation position is changed depending on the position of the substrate, it is difficult to uniformly treat the substrate. Accordingly, it is necessary to keep the moving speed of the irradiation position constant. Further, in order to change the moving direction of the irradiation position, as shown in portions surrounded by the broken line of FIG. 20, the change is generally conducted when the irradiation position leaves the substrate. After the irradiation position left the substrate, the moving of the substrate is once stopped, and the moving direction of the substrate is changed. Then, after the moving speed of the substrate is increased to the fixed value again, it is necessary to conduct the irradiation to the substrate of the laser light. Consequently, it necessarily takes a predetermined time to change the direction of the substrate, with the result that processing speed of the substrate is lowered.

This is a problem, which is caused also in the case where the irradiation direction of the beam is changed. Since it takes a predetermined time to change the irradiation direction of the beam, it results in lowering the processing speed of the substrate.

In particular, in case of the continuous oscillation laser, differently from the pulse oscillation laser, the size of the beam spot is originally small. Thus, processing efficiency is poor and it is an important object to improve the processing speed of the substrate.

SUMMARY OF THE INVENTION

The present invention has been made in view of the above problems, and therefore it is an object of the present invention to provide a continuous oscillation laser apparatus and a method of manufacturing a semiconductor device using the continuous oscillation laser apparatus, which can enhance a processing efficiency in comparison with the conventional example.

A laser apparatus of the present invention includes: first means for setting up an object to be processed; second means for moving, on a fixed straight line, a position of the first means in which the object to be processed is set up; third means for rotating the object to be processed, the first means and the second means such that the center thereof exists on an extension of the straight line; and fourth means for allowing a laser light irradiation from a definite position and a definite direction towards the object to be processed rotating by the third means.

Even when a laser apparatus of the present invention irradiates a laser light from a definite position and a definite direction, it is possible to move the irradiation position of the laser light in the object to be processed in X direction and Y direction by the second means and the third means without changing the moving direction of the object to be processed and to irradiate the overall surface of the object to be processed with the laser light. Accordingly, there is caused no loss of time according to the change of the moving direction of the object to be processed and it is possible to enhance the processing efficiency in comparison with the conventional example.

Further, in a laser light irradiated by the fourth means, irradiation angle with respect to the object to be processed is fixed irrespective of the irradiation position. Therefore, it is possible to prevent intensity of the beam returning by reflecting within the object to be processed, intensity of interference and the like from differing depending on the irradiation position, and to substantially uniformly treat the object to be processed. For example, in the case where the semiconductor film is crystallized by laser irradiation, it is possible to prevent a difference from being caused in crystallinity depending on the position of the semiconductor film. Then, it is possible to simplify an optical system in comparison with the case where the object to be processed in whole is irradiated with the laser light by changing the irradiation direction of the beam.

Note that it is possible to treat a plurality of objects to be processed at the same time by providing the plural first means and the plural second means. In this case, the plurality of the first means by the plurality of the second means may be each moved on the straight lines whose directions are each different. Incidentally, a center of the rotation according to the third means exists on an extension of all the straight lines. With the above structure, it is possible to further enhance the processing efficiency.

Note that, although the laser apparatus of the present invention is assumed to be a continuous oscillation laser, a pulse oscillation laser may be used, of course.

Further, usage of the laser apparatus of the present invention is not limited only to the crystallization of the semiconductor film. The laser apparatus of the present invention can be applied to the above-mentioned laser annealing method in general.

BRIEF DESCRIPTION OF THE DRAWINGS

In the accompanying drawings:

FIGS. 5A and 5B are diagrams showing a position where the laser light is irradiated;

FIGS. 13A to 13C are diagrams showing a manufacturing method for a semiconductor device using the laser apparatus of the present invention;

FIGS. 14A to 14C are diagrams showing a manufacturing method for the semiconductor device using the laser apparatus of the present invention;

DESCRIPTION OF THE PREFERRED EMBODIMENTS

Figure 1A:
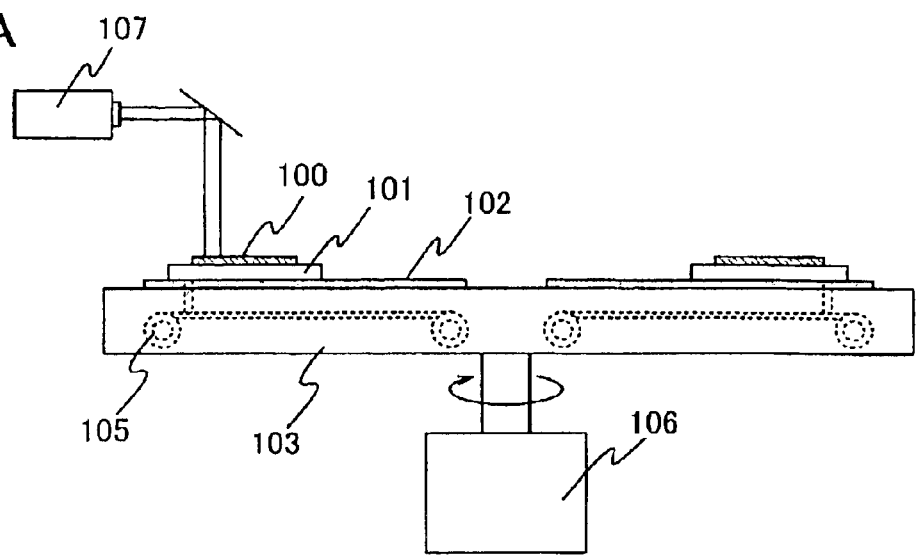
FIGS. 1A and 1B are diagrams showing a structure of a laser apparatus of the present invention.
Figure 1B:
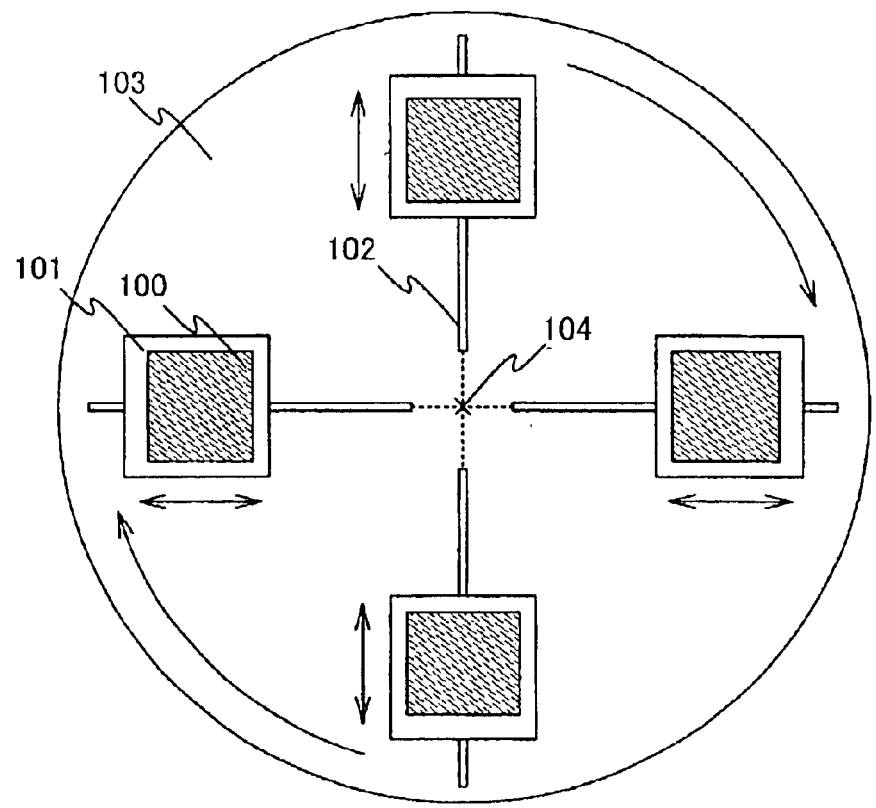

Hereinafter, a structure of a laser apparatus of the present invention will be described. FIG. 1A shows a side view of a light emitting device of the present invention and FIG. 1B shows a top view thereof.

A laser apparatus of the present invention shown in FIG. 1 has a plurality of stages 101 corresponding to first means for setting up an object to be processed. Here, there is shown an example where four stages are provided. It is possible to further enhance the processing efficiency by providing a plurality of stages and treating a plurality of objects to be processed at the same time. On each of the stages 101, an object to be processed 100 irradiated with a laser light is set up.

Each of the stages 101 is capable of moving along a guide rail 102 provided on a rotating body 103. Note that the guide rail 102 is set up such that the stage 101 moves on a straight line, when the stage 101 is moved along the guide rail 102. On an extension of a linear locus where the stage 101 is moved, there exists a center 104 of the rotation of the rotating body 103.

Note that two stages or more may be moved along one guide rail.

Means for moving the stage 101 along the guide rail 102 corresponds to second means which the laser apparatus of the present invention has. More specifically, in FIGS. 1A and 1B, a motor 105 provided in the rotating body 103 and a guide rail 102 correspond to the second means. However, it is sufficient that the second means in the laser apparatus of the present invention can move the stage 101 on a straight line, and the second means is not limited to the structure shown in FIGS. 1A and 1B.

Further, the rotating body 103 can rotate the first means and the second means in the direction of an arrow using 104 as a center by a motor 106 for rotating body 103 (hereinafter referred to as a motor for rotating body). The direction of the rotation is arbitrarily set by a designer. The rotating body 103 and the motor for rotating body 106 correspond to third means of the laser apparatus of the present invention.

Further, it is possible to irradiate the laser light to the object to be processed 100 from a definite position and a definite direction by oscillation apparatus and other optical systems 107. The oscillation apparatus and other optical systems 107 correspond to fourth means of the laser apparatus of the present invention.

A laser can be arbitrarily changed according to the purpose of the processing. As the fourth means of the laser apparatus of the present invention, a well known laser can be used. As a laser, a gas laser or a solid laser of continuous oscillation or pulse oscillation can be used. As a gas laser, there is an excimer laser, an Ar laser, a Kr laser, or the like. As a solid laser, there is a YAG laser, a $YVO_4$ laser, a YLF laser, a $YAlO_3$ laser, a glass laser, a ruby laser, an alexandrite laser, a Ti: sapphire laser, a $Y_2O_3$ laser, or the like. As a solid laser, there is applied a laser using crystal such as YAG, $YVO_4$, YLF, or $YAlO_3$ doped with Cr, Nd, Er, Ho, Ce, Co, Ti, Yb or Tm. A fundamental wave of the laser concerned depends on a doped material and a laser light having the fundamental wave of around 1 μm is obtained. A harmonic wave with respect to the fundamental wave can be obtained by using a nonlinear optical element.

Furthermore, an infrared laser light generated from the solid laser is converted to a green laser light by the nonlinear optical element, and thereafter an ultraviolet laser light obtained by another nonlinear optical element may be used.

Note that the laser apparatus of the present invention may include means for regulating a temperature of the object to be processed in addition to the above four means.

Figure 2A:
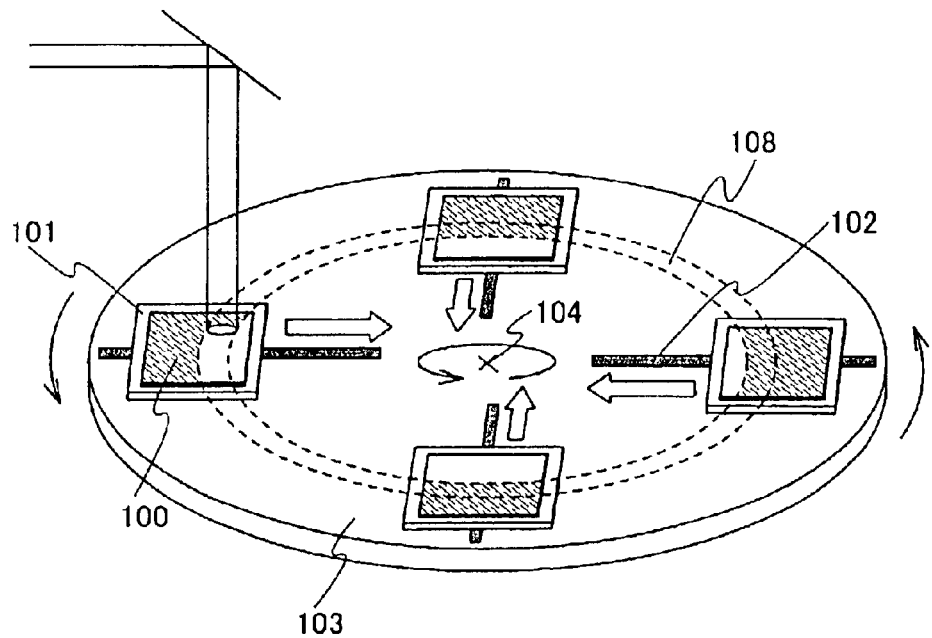
FIGS. 2A and 2B are diagrams showing a structure of the laser apparatus of the present invention.
Figure 2B:
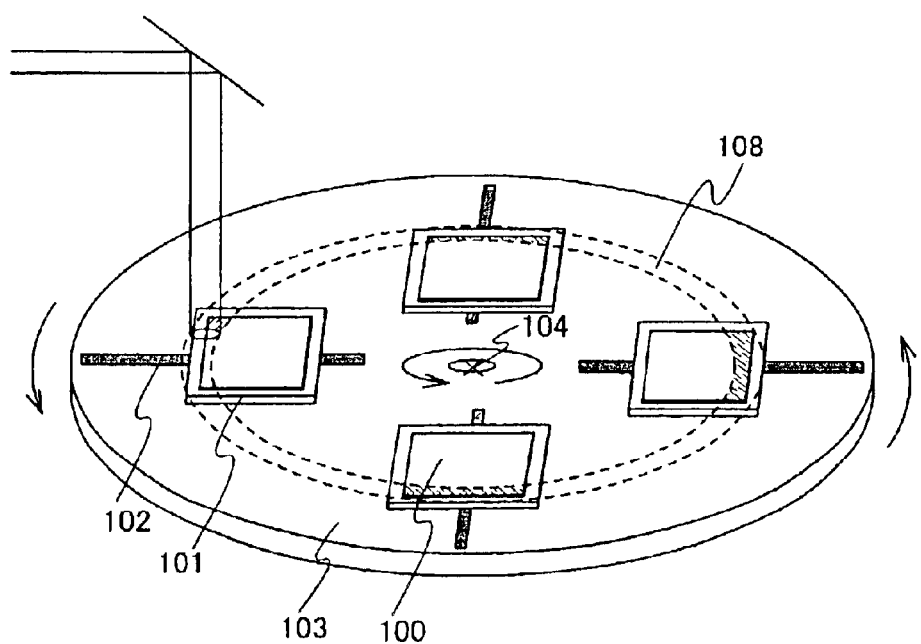

Next, an explanation is made regarding how the laser light is actually irradiated to the object to be processed 100. FIGS. 2A and 2B show a state where the laser light is irradiated to the object to be processed 100 by the laser apparatus shown in FIGS. 1A and 1B.

FIGS. 2A and 2B show a positional change of the stage 101 with a time in the laser light irradiation to the object to be processed 100. As shown by an outline arrow, the stage 101 moves from the position of FIG. 2A to the position of FIG. 2B, i.e., toward the center 104 of the rotation of the rotating body 103. The rotating body 103 rotates about the center 104.

By the rotating body 103 rotating, the laser light is irradiated on the rotating body 103 so that it draws a locus 108 shown by a broken line. The locus 108 of the laser light draws a circle using 104 as a center. The object to be processed 100 is irradiated with the laser light on the portion where the object to be processed 100 overlaps the locus of the laser light.

Note that, since the laser light is irradiated on a portion on the rotating body 103 which does not overlap the object to be processed 100, the rotating body 103 is desirably formed of a material which is not deformed or damaged by the laser light.

Further, since the stage 101 is moved in the direction of the outline arrow, the portion where the object to be processed 100 and the locus 108 of the laser light overlap is shifted with a time, and ultimately the overall surface of the object to be processed 100 can be irradiated with the laser light.

Figure 3:
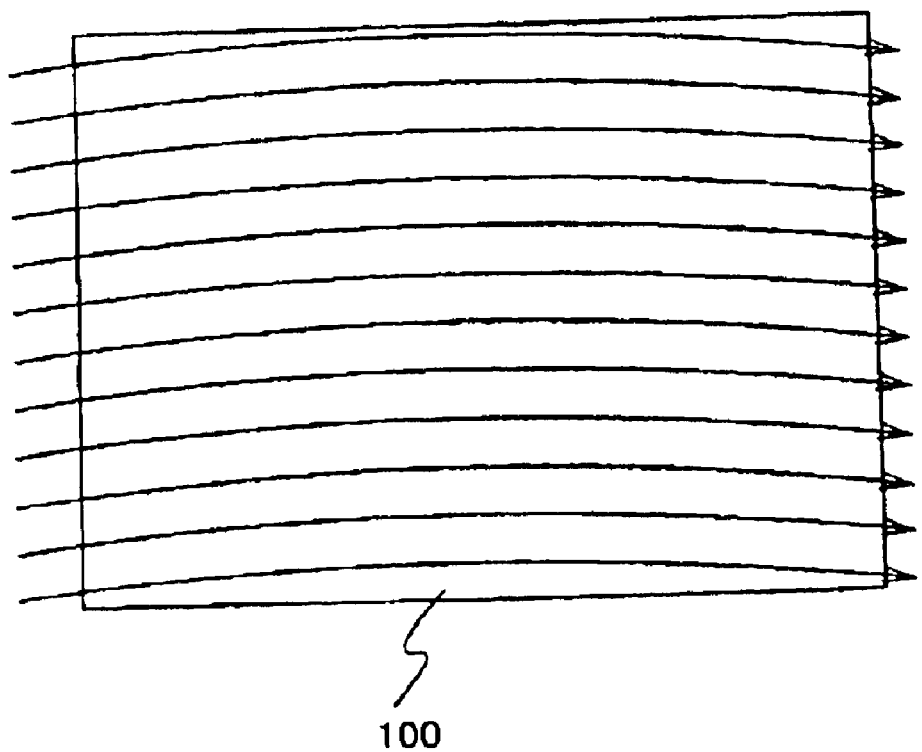
FIG. 3 is a diagram showing a moving direction of an irradiation position of a laser light in an object to be processed.

FIG. 3 shows a moving direction of the irradiation position of the laser light in the object to be processed 100 irradiated with the laser light, by an arrow. The number of arrows is the same as the number of rotations of the rotating body 103. As the number of rotations is increased, the number of arrows is increased.

It is desirable that a speed at which the irradiation position moves is always kept uniform in order to keep the irradiation time according to the location of the object to be processed constant. For example, in the case of use in crystallization of the semiconductor film, when the energy density is $5\times10^4$ to $1.3\times10^5$ (cm²/W), the moving speed of the irradiation position may be kept at 10 to 100 cm/sec, preferably 20 to 50 cm/sec.

Note that the overall surface of the object to be processed 100 is to be irradiated with the laser light, the rotational speed (angular speed) of the rotating body 103 and the moving speed of the stage 101 need to be approximately controlled. When the moving speed of the stage 101 with respect to the rotational speed of the rotating body 103 is too fast, the overall surface of the object to be processed cannot be irradiated with the laser light.

Further, it is important to decide the rotational speed of the rotating body 103 and the moving speed of the stage 101, while taking into account an appropriate irradiation time of the laser light on each portion of the object to be processed 100. By controlling the rotational speed of the rotating body 103 and the moving speed of the stage 101, it is possible to irradiate the laser light to each portion of the object to be processed 100 a plurality of times. Also, the stage 101 is moved in one direction and thereafter is moved in the reverse direction, thereby being capable of irradiating the laser light to the object to be processed 100 a plurality of times.

Note that, although the moving direction of the stage 101 is toward the center 104 of the rotating body in FIGS. 2A and 2B, the stage 101 may be moved in a direction departing from the center 104 of the rotating body.

With the above structure, in the laser apparatus of the present invention, even when the laser light is irradiated from a definite position and a definite direction, it is possible to move the irradiation position of the laser light in the object to be processed without changing the moving direction of the object to be processed and to irradiate the overall surface of the object to be processed with the laser light. Accordingly, there is caused no loss of time according to the change of moving direction of the object to be processed, and it is possible to enhance the processing efficiency in comparison with the conventional example.

Further, since in the laser light, the irradiation angle with respect to the object to be processed is fixed irrespective of the irradiation position, it is possible to prevent intensity of a beam returning by reflecting on the object to be processed, intensity of interference, and the like from differing depending on the irradiation position and to substantially uniformly treat the object to be processed. For example, in the case where the semiconductor film is crystallized by laser irradiation, it is possible to prevent a difference from being caused in crystallinity depending on the position of the object to be processed. Then, it is possible to simplify an optical system in comparison with the case where the object to be processed in whole is irradiated with the laser light by changing the irradiation direction of the beam.

Hereinafter, embodiments of the present invention will be described.

(Embodiment 1)

In this embodiment, a description will be made of a case where the object to be processed is irradiated with the laser light twice or more by moving the stage on a rotating body where the object to be processed is set up in one direction and thereafter moving it in the reverse direction.

Figure 4A:
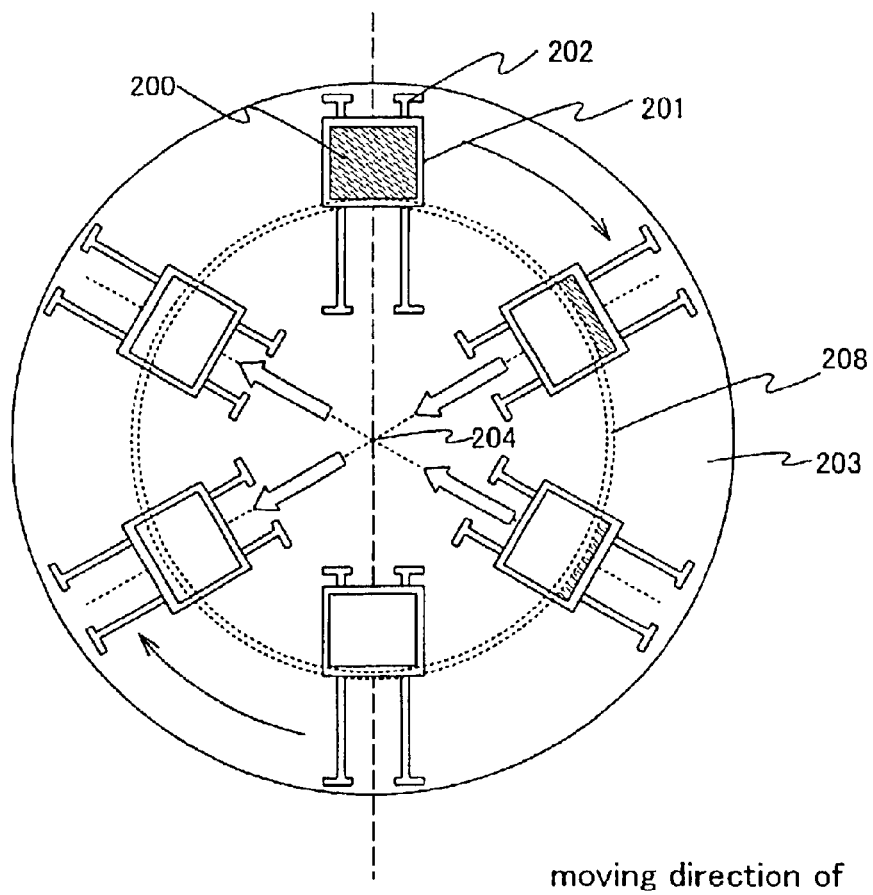
FIG. 4A is a diagram showing a structure of the laser apparatus of the present invention.

FIG. 4A shows a top view of a rotating body and a stage which the laser apparatus of this embodiment comprise. In this embodiment, the laser apparatus capable of treating six objects to be processed at the same time will be described. Incidentally, the number of objects to be processed can be arbitrarily determined by a designer.

The laser apparatus of the present invention shown in FIG. 4A has six stages 201 corresponding to first means for setting up the object to be processed thereon. It is possible to further enhance the processing efficiency by providing a plurality of stages and treating a plurality of objects to be processed at the same time. On each of the stages 201, an object to be processed 200 irradiated with the laser light is set up.

Each of the stages 201 can move along a guide rail 202 provided on a rotating body 203. Note that the guide rail is set up such that the stage 201 moves on a straight line when the stage 201 is moved along the guide rail 202. On an extension of the linear locus where the stage 201 is moved, there exists a center 204 of the rotation of the rotating body 203. Two stages or more may be moved along one guide rail. Note that the guide rail is not limited to the shape shown in FIG. 4A. Further, even if the guide rail is not provided, it is sufficient that the stage 201 can be moved on the straight line.

Further, the rotating body 203 can rotate the stage 201 as the first means and the guide rail 202 as the second means in the direction of an arrow using 204 as the center. The direction of the rotation can be arbitrarily set by a designer.

The stage 201 moves along the guide rail 202 toward the center 204 of the rotation of the rotating body 203 as shown by an outline arrow. The rotating body 203 rotates about the center 204.

By the rotating body 203 rotating, the laser light is irradiated on the rotating body 203 so that it draws a locus 208 shown by a broken line. The locus 208 of the laser light draws a circle using 204 as the center. The object to be processed 200 is irradiated with the laser light on the portion where the object to be processed 200 overlaps the locus of the laser light.

Since the stage 201 is moved in the direction of the outline arrow, the portion where the object to be processed 200 and the locus 208 of the laser light overlap is shifted with a time, and ultimately the overall surface of the object to be processed 200 can be irradiated with the laser light. Then, in this embodiment, after the stage 201 is moved in one direction irradiating the overall surface of the object to be processed, the stage 201 is moved in the reverse direction irradiating the overall surface of the object to be processed again.

Figure 4B:
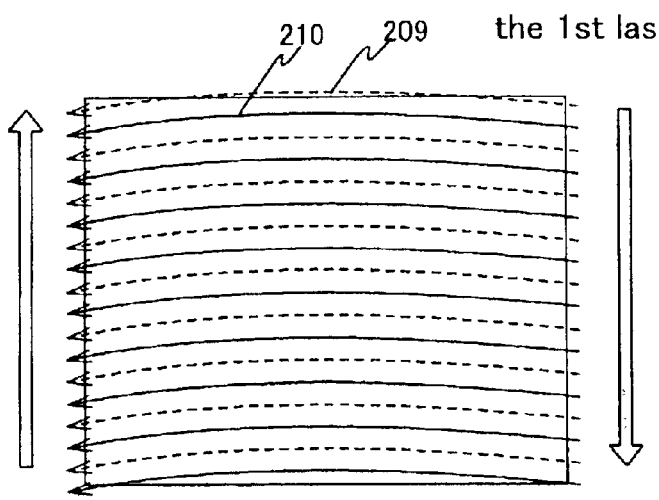
FIG. 4B is a diagram showing a moving direction of the irradiation position of the laser light in the object to be processed.

FIG. 4B shows a moving direction of the irradiation position of the laser light in the object to be processed 200 irradiated with the laser light as shown in FIG. 4A, by an arrow. An arrow 209 shows a moving direction of the irradiation position of the laser light according to laser irradiation for the first time. Similarly, all the broken arrows show a moving direction of the irradiation position of the laser light according to the laser irradiation for the first time. An arrow 210 shows a moving direction of the irradiation position of the laser light according to laser irradiation for the second time. Similarly, all the solid arrows show a moving direction of the irradiation position of the laser light according to the laser irradiation for the second time. The number of arrows is the same as the number of rotations of the rotating body 203. As the number of rotations is increased, the number of arrows is increased.

Note that, when the overall surface of the object to be processed 200 is to be irradiated with the laser light, the rotational speed of the rotating body 203 and the moving speed of the stage 201 need to be approximately controlled. When the moving speed of the stage 201 with respect to the rotational speed of the rotating body 203 is too fast, the overall surface of the object to be processed cannot be irradiated with the laser light.

Further, it is important to decide the rotational speed of the rotational body 203 and the moving speed of the stage 201, while taking into account an appropriate irradiation time of the laser light on each portion of the object to be processed 200.

With the above structure, it is possible to consecutively perform laser irradiation twice and to further enhance the processing efficiency.

(Embodiment 2)

In this embodiment, in the case where laser irradiation is performed a plurality of times, a case is described where the laser light is irradiated so that the edge portions of the laser light in each irradiation do not overlap with each other.

In general, in the laser light, an energy of the edge portion is smaller than the other portion. Therefore, in this embodiment, several laser irradiations are carried so that the edge portions of the laser light should not overlapped with each other, and thereby in order that the smaller energy of edge portion is covered.

In order to prevent the edge portions of the laser light in each irradiation from overlapping with each other, there is a method in which a range where the stage is moved is shifted in the first laser irradiation and the second laser irradiation. FIG. 5A is a sectional view of the laser apparatus in the first laser irradiation and FIG. 5B is a sectional view of the laser apparatus in the second laser irradiation. Reference numeral 301 denotes a rotating body, 302 denotes a guide rail, 303 denotes a stage and 304 denotes an object to be processed.

A range where the stage 303 is moved is shown by an arrow, in the case of the first laser irradiation and in the case of the second laser irradiation, respectively. In both cases, the stage is moved on the same straight line and a length of the moving range is also the same. However, a distance between the moving range of the stage 303 and a center 305 of the rotating body is different.

According to the above method, the edge portion of the laser light in the first laser irradiation and the edge portion of the laser light in the second laser irradiation do not overlap, so that the smaller energy of edge portion can be covered.

It is possible to implement this embodiment combined with Embodiment 1.

(Embodiment 3)

In this embodiment, in the case where laser irradiation is performed a plurality of times, a method is described in which the laser light is irradiated so that the edge portions of the laser light in each irradiation do not overlap with each other, and which is different from the method of Embodiment 2.

Figure 6:
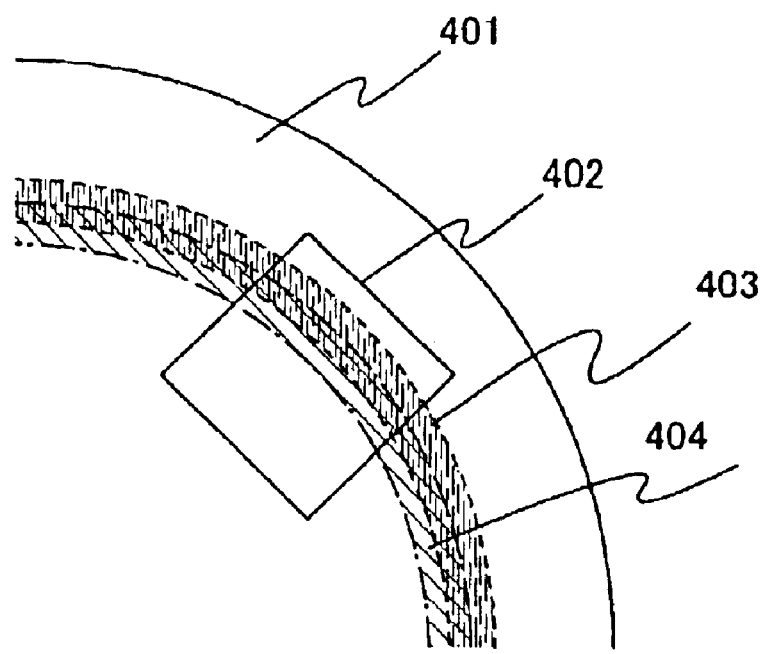
FIG. 6 is a diagram showing a position where the laser light is irradiated.

In this embodiment, in order for the edge portions not to overlap, in the first laser irradiation and the second laser irradiation, the irradiation position of the laser light on the rotating body is changed. FIG. 6 shows a locus of the laser light in the first laser irradiation and the second laser irradiation on the rotating body. Reference numeral 401 shows a rotating body and 402 shows an object to be processed.

Reference numeral 403 shows a locus of the laser light in the first irradiation and 404 shows a locus of the laser light in the second laser irradiation. The locus 403 of the laser light and the locus 404 of the laser light overlap with each other and the edge portions do not overlap with each other. In the first laser irradiation, processing is performed on the portion where the object to be processed 402 overlaps the locus 403 of the laser light. In the second laser irradiation, processing is performed on the portion where the object to be processed 402 overlaps the locus 404 of the laser light.

According to the above method, the edge portion of the laser light in the first laser irradiation and the edge portion of the laser light in the second laser irradiation do not overlap, so that the ununiformity of the energy on the edge portion is relaxed, thereby being capable of substantially uniformly treating the object to be processed.

It is possible to implement this embodiment combined with Embodiment 1 or Embodiment 2.

(Embodiment 4)

In this embodiment, an explanation is made for a structure for irradiating the laser light from a top surface and a back surface of a film to be processed formed on the object to be processed.

Figure 7A:
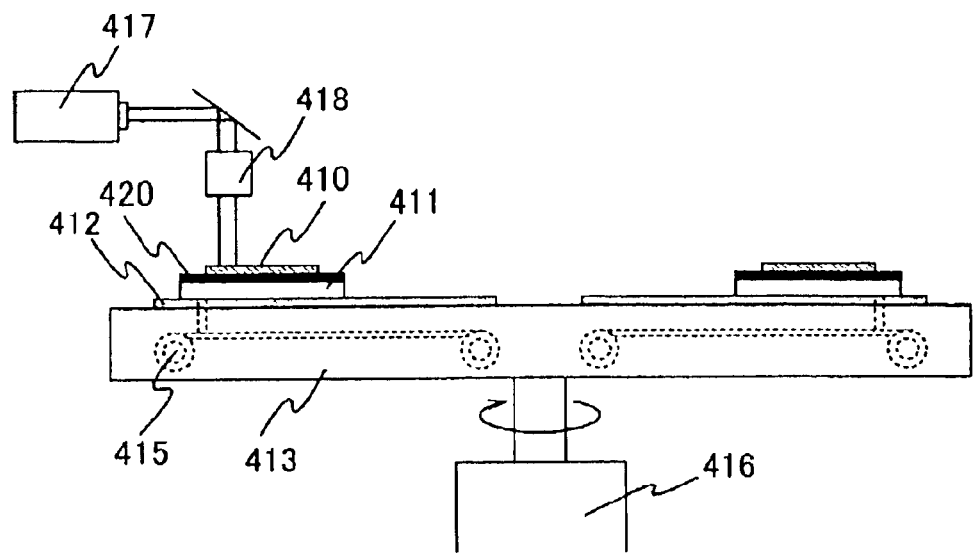
FIGS. 7A and 7B are diagrams showing a structure of the laser apparatus of the present invention.

FIG. 7A shows a side view of the laser apparatus of this embodiment. The laser apparatus of the present invention shown in FIG. 7A has a reflector 420 for reflecting the laser light disposed between an object to be processed 410 and a stage 411.

The stage 411 is capable of moving along a guide rail 412 provided on a rotating body 413 by a motor 415. On an extension of a linear locus where the stage 411 moves, there exists a center of the rotation of the rotating body 413. The rotating body 413 rotates by a motor 416 for the rotating body 413 (hereinafter referred to as a motor for rotating body).

Then, it is possible to irradiate the laser light on the object to be processed 410 from a definite position and a definite direction by oscillation apparatus and other optical systems 417 and an optical system 418.

Further, in this embodiment, in order to prevent a so-called return light, that is a part of the laser light reflecting on the surface of the substrate and returning on the same light path that the light followed at the time of entering, from exerting a harmful influence such as variation of an output, a frequency, and so forth of the laser oscillation apparatus, and destruction of a rod, the laser light is made to enter obliquely the substrate instead of being made to enter vertically the substrate. In this case, since the laser light is high in directivity and the energy density, it is preferable that the reflected light is absorbed by providing a damper in order to prevent the reflected light from irradiating an inappropriate portion. Note that a cooling water circulates through the damper, thereby preventing the temperature of the damper from rising due to the absorption of the reflected light.

Note that, even if the laser light is not made to enter obliquely the substrate, an isolator may be provided in order to remove the return light and stabilize an oscillation of the laser.

Figure 7B:
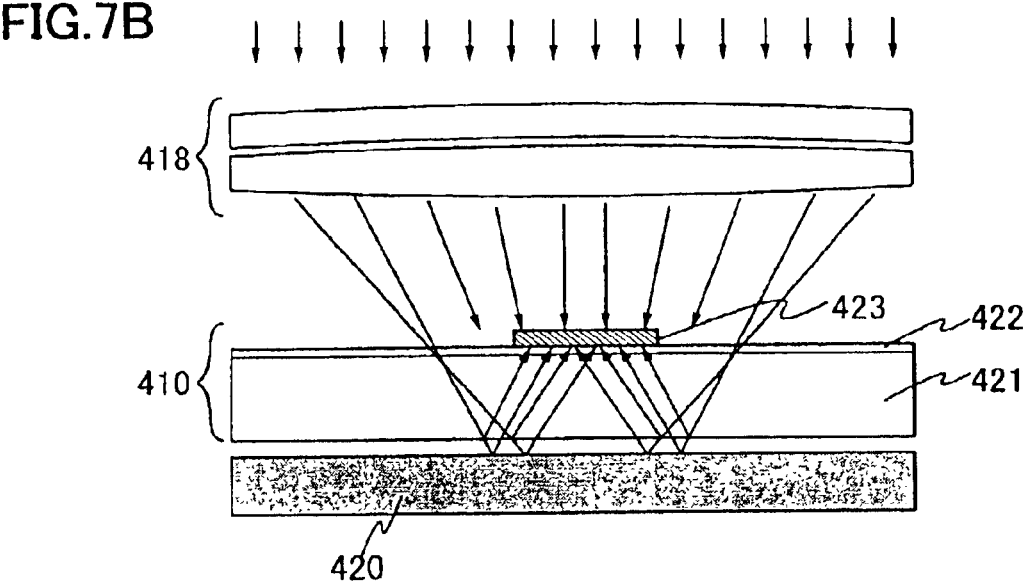

FIG. 7B shows a positional relationship between the object to be processed 410 and the reflector 420 in FIG. 7A.

In FIG. 7B, the object to be processed 410 is composed of a substrate 421 having light transmittance, an insulating film 422 formed on the top surface thereof (surface on the side where a thin film or an element is formed) and an amorphous semiconductor film 423. Further, the reflector 420 for reflecting the laser light is disposed below the transmissive substrate 421.

As the transmissive substrate 421, there is used a glass substrate, a quartz substrate, a crystallization glass substrate or a plastic substrate. Also, as the insulating film 422, an insulating film may be used which includes silicon such as a silicon oxide film or silicon oxynitride film (SiOxNy). As the amorphous semiconductor film 423, an amorphous silicon film, an amorphous silicon germanium film or the like may be used.

Further, the reflector 420 may be the substrate on the surface (reflection surface of the laser light) of which a metal film is formed or the substrate formed of a metal element. In this case, as the metal film, any material may be used. Typically, there is used a metal film including any one of the elements selected from the group consisting of aluminum, silver, tungsten, titanium, and tantalum.

Furthermore, instead of disposing the reflector 420, by directly forming the above-mentioned metal film on the back surface (the surface opposite to the top surface) of the transmissive substrate 421, it is possible to make the laser light reflect there. Incidentally, it is assumed that the structure is obtained such that the metal film formed on the back surface is not removed during the manufacturing process of the semiconductor device.

Then, the laser light linearly processed via the optical system 418 (in the figure, it denotes only a cylindrical lens) is irradiated on the amorphous semiconductor film 423. At this time, in the laser light irradiated on the amorphous semiconductor film 423, in order to obtain the laser light directly irradiated after passing through the optical system 418 and the laser light which is once reflected on the reflector 420 and irradiated on the amorphous semiconductor film 423, it is necessary to design the optical system 418. Further, in this specification, the laser light irradiated on the top surface of the amorphous semiconductor film is called a primary laser light and the laser light irradiated on the back surface is called a secondary laser light.

The laser light passing through the optical system 418 has an incident angle of 45 to 90 with respect to the substrate surface in the process of being condensed. Therefore, the secondary laser light gets into the back surface side of the amorphous semiconductor film 423 to be irradiated. Further, it is possible to obtain the secondary laser light more effectively by diffusely reflecting the laser light when undulations are provided on the reflection surface of the reflector 420.

In particular, a wavelength of the second harmonic wave of the YAG laser is 532 nm, which is within a range of the wavelength in which the laser light is reflected on the amorphous semiconductor film at minimum when irradiated on the amorphous semiconductor film (around 530 nm). Further, in this range of the wavelength, since the laser light transmitting the amorphous semiconductor film has a sufficient light amount, it is possible to conduct irradiation more effectively by irradiating the amorphous semiconductor film from the back surface again using the reflector. Furthermore, the laser energy of the second harmonic wave is large, which is about 1.5 J/pulse at the maximum value (in the existing YAG laser apparatus). When linearly processed, it is possible to greatly increase the length of the longitudinal direction, thereby being capable of conducting laser light irradiation collectively on a large area.

FIG. 7C shows a positional relationship between the object to be processed 410 and the reflector 420, viewed from an arrow 425 of FIG. 7A. In this embodiment, in order to prevent the return light from returning to the oscillation apparatus 417 by following the light path which the light originally followed, an incident angle with respect to the substrate 421 is kept such that it is larger that 0°, and smaller than 90°. More specifically, it is kept at 5 to 30°.

Further, in the case where an incident surface is defined as a plane which is vertical to an irradiation surface and includes, when the long beam shape is assumed to be a rectangle, a short side of the rectangle, it is desirable that the incident angle $\theta$ of the laser beam satisfies $\theta \geq $ arctan (W/2d), where the short side is W in length and the thickness of the substrate set up on the irradiation surface and having light transmittance with respect to the laser beam is d. Note that, when the locus of the laser beam is not on the incident surface, it is assumed that the incident angle of the one whose locus is projected on the incident surface is $\theta$. When the laser beam is made to enter at this incident angle $\theta$, the reflected light on the top surface of the substrate and the reflected light from the back surface of the substrate do not interfere, thereby being capable of uniformly irradiating the laser beam. In this discussion, the refractive index of a substrate is treated as 1. However most refractive indexes of substrates are approximately 1.5, and considering these values, the calculated angle, which is larger than the above mentioned value, is obtained. However because of the energy loss on the both edges of an elongated direction of a laser beam, the effect of interferance is small. Therefore, the above mentioned caluculated value is sufficient to obtain the effect of reducing the interference.

As has been described, according to the present embodiment, it is possible to conduct irradiation on the top surface and the back surface of the amorphous semiconductor film by separating the laser light into the primary laser light and the secondary laser light.

It is possible to implement this embodiment combined with Embodiments 1 to 3.

(Embodiment 5)

In the this embodiment, an explanation is made for a case where the semiconductor film formed by a well-known film formation method on the insulating surface is patterned to obtain an island-like shape, and crystallized by laser annealing using the laser apparatus of the present invention.

Figure 8A:
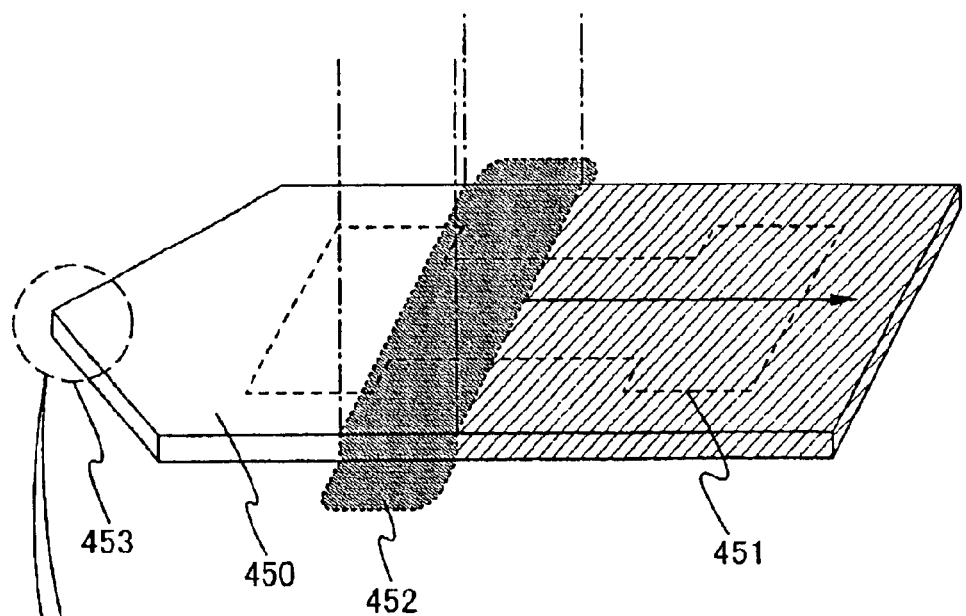
FIGS. 8A and 8B are diagrams showing a position where the laser light is irradiated.

FIG. 8A shows a state where an island-like semiconductor film 450 is irradiated with the laser light and crystallized. The island-like semiconductor film 450 has an amorphous structure. A material for the semiconductor is not limited but it is preferably formed of silicon, a silicon germanium (SiGe) alloy, or the like.

A broken line 451 shows a position of an active layer of a TFT obtained through patterning after the island-like semiconductor film 450 is crystallized by laser annealing. An irradiation position 452 of the laser light is moved in the direction of a carrier moving or the reverse direction thereof.

Figure 8B:
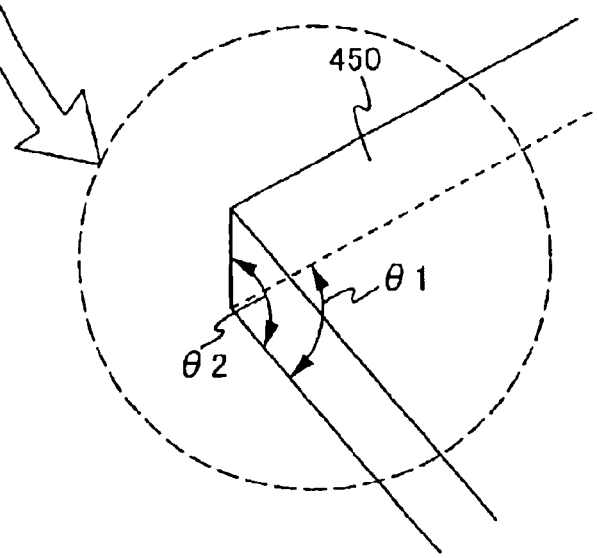

FIG. 8B is an enlarged view of a portion 453 where the laser light is irradiated first in the island-like semiconductor film 450. In this embodiment, irradiation of the laser light is intentionally started from an edge portion of the island-like semiconductor film. The edge portion indicates a portion having an angle of the semiconductor film when the island-like semiconductor film is viewed from the direction of the laser light being irradiated.

In FIG. 8B, the edge angle $\theta 1$ when viewed from the direction of the laser light being irradiated is assumed to be less than 180°. Further, an angle $\theta 2$ of a side surface of the island-like semiconductor film 450 with respect to the insulating surface is assumed to be 90±10°, more desirably, 90±5°.

When irradiation with the laser light is started from the edge portion that the island-like semiconductor film 450 has, crystal having orientation of (100) plane starts to grow from the edge portion. Then, when the laser light irradiation to the island-like semiconductor film 450 is completed, it is possible to enhance orientation rate of the (100) plane of the entire island-like semiconductor film 450.

When the orientation rate of the (100) plane of the semiconductor film is enhanced, it is possible to increase the mobility of the TFT when used as the active layer. Further, when the orientation rate of the (100) plane of the semiconductor film is high, it is possible to reduce variation of film quality of a gate insulating film formed thereon, thereby being capable of reducing variation of threshold voltage of the TFT.

Next, an explanation is made for a case where the above-mentioned crystallizing method for the semiconductor film is applied to a manufacturing method for an active matrix semiconductor display device which has the driving circuit on the same substrate as the pixel portion.

Figure 9A:
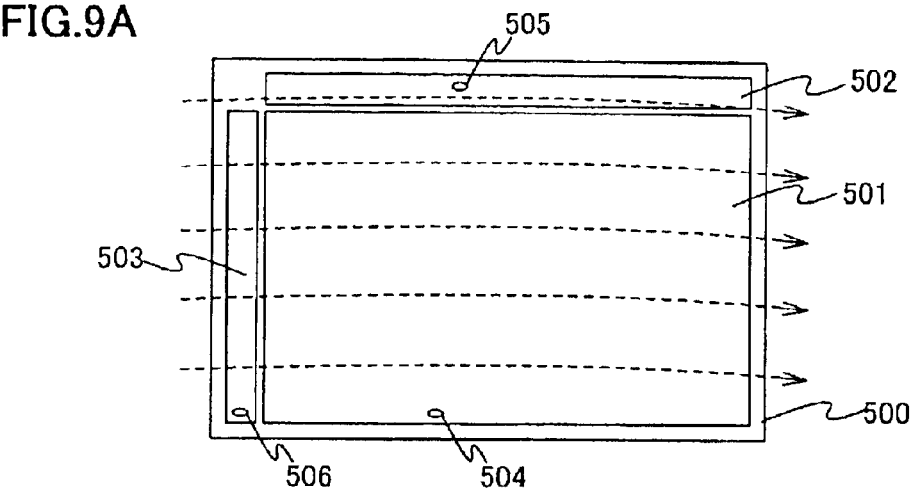
FIGS. 9A to 9D are diagrams showing a method of irradiating the laser light on a liquid crystal panel.

FIG. 9A is a top view of a liquid crystal panel provided with a pixel portion 501, a signal line driving circuit 502 and a scanning line driving circuit 503 on a substrate 500. In FIG. 9A, an irradiation position of the laser light is moved toward the direction of an arrow shown by a broken line.

Figure 9B:
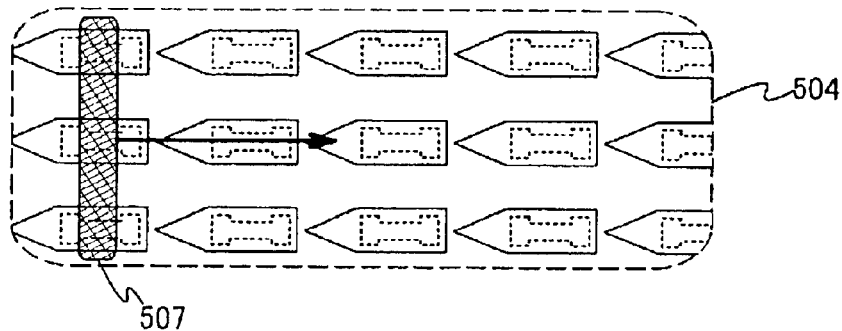
Figure 9C:
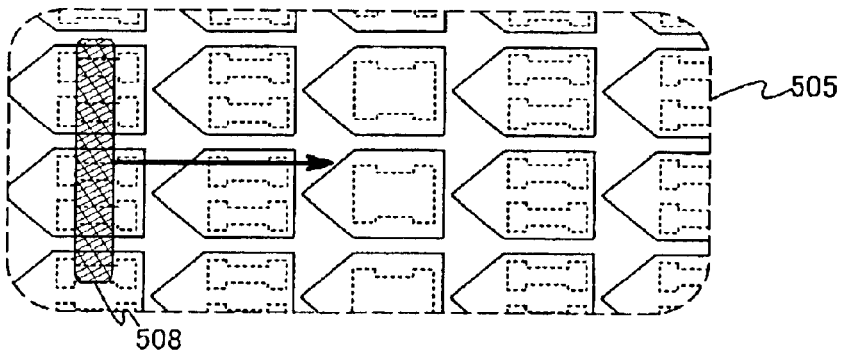
Figure 9D:
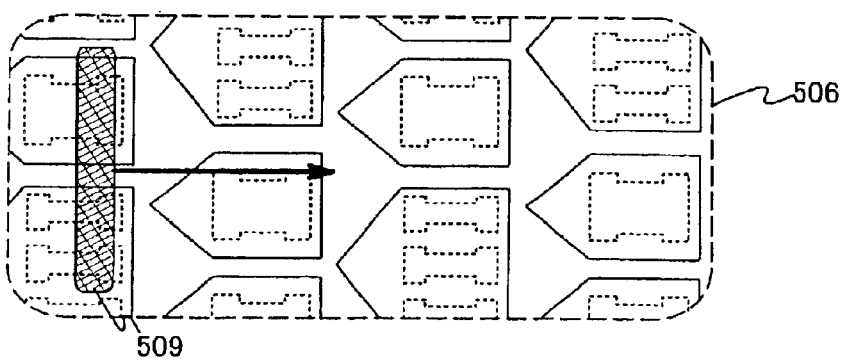

FIG. 9B is an enlarged view of a portion 504 of the pixel portion 501, FIG. 9C is an enlarged view of a portion 505 of the signal line driving circuit 502, and FIG. 9D is an enlarged view of a portion 506 of the scanning line driving circuit 503 of FIG. 9A.

A plurality of island-like semiconductor films as the active layer of each TFT are formed in the pixel portion 501, the signal line driving circuit 502 and the scanning line driving circuit 503, respectively. Regions shown by reference numerals 507, 508 and 509 are irradiated with the laser light and each region is moved in the direction of an arrow.

Then, the respective island-like semiconductor films are disposed such that irradiation with the laser light is started from the edge portion.

Note that a size and a shape of the island-like semiconductor film are determined according to a shape of a TFT formed in the pixel portion 501, the signal line driving circuit 502, and the scanning line driving circuit 503, respectively. Further, one island-like semiconductor film may form a plurality of active layers of the TFTs.

It is possible to implement this embodiment combined with Embodiments 1 to 4.
(Embodiment 6)

In this embodiment, an explanation is made for the oscillation apparatus of the laser light and other optical systems used in the laser apparatus of the present invention.

Figure 10:
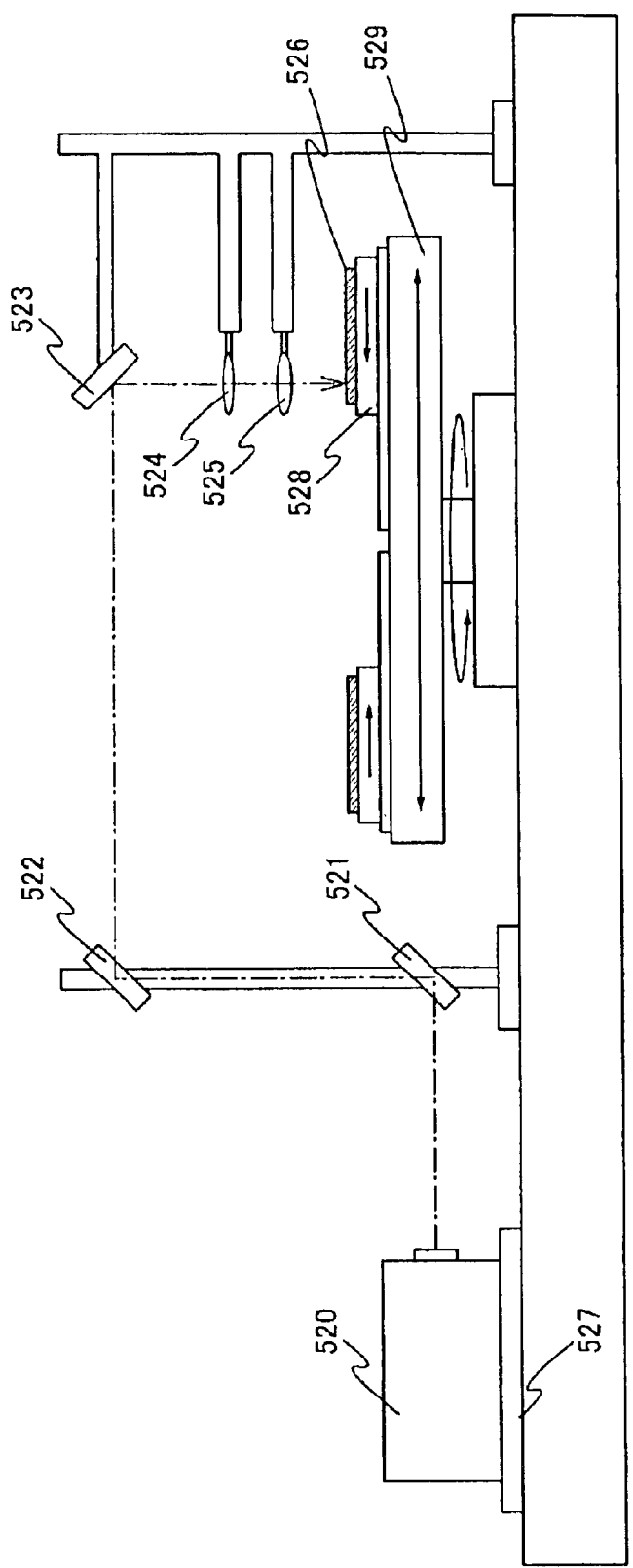
FIG. 10 is a diagram showing a structure of the laser apparatus of the present invention.

FIG. 10 shows a structure of the laser apparatus of this embodiment. Reference numeral 520 denotes an oscillation apparatus of the laser light capable of continuous oscillation or pulse oscillation. The oscillation apparatus 520 is made to keep the temperature constant by a tiller 527. The tiller 527 is not necessarily provided, but by keeping the temperature of the oscillation apparatus 520 constant, it is possible to prevent the energy of the laser light outputted from the oscillation apparatus from varying depending on the temperature of the oscillation apparatus.

Light path of the laser light outputted from the oscillation apparatus 520 is changed by fixed mirrors 521, 522, and 523. The laser light is condensed by lenses 524 and 525 such as a collimator lens or a cylindrical lens and is irradiated on an object to be processed 526 set up on a stage 528. Of course, the number of optical systems is not limited, and it is sufficient that there is provided means for irradiating the laser light on the object to be processed from a definite position and a definite angle.

Note that the laser light irradiated on the object to be processed reflects on the surface and enters again the optical system, as a result of which a damage is caused on the laser oscillation apparatus in some cases. Therefore, it is desirable that the laser light is made to enter the object to be processed at a predetermined angle.

Then, the stage 528 is linearly moved on a rotating body 529 and the rotating body 529 is rotated using as a center a point existing on an extension of the locus where the stage 528 moved. As a result, the irradiation position of the laser light on the object to be processed 526 is moved, thereby being capable of treating the overall surface of the object to be processed 526.

It is possible to implement this embodiment combined with Embodiments 1 to 5.
(Embodiment 7)

In this embodiment, an explanation is made for the oscillation apparatus of the laser light and other optical systems used in the laser apparatus of the present invention.

Figure 11:
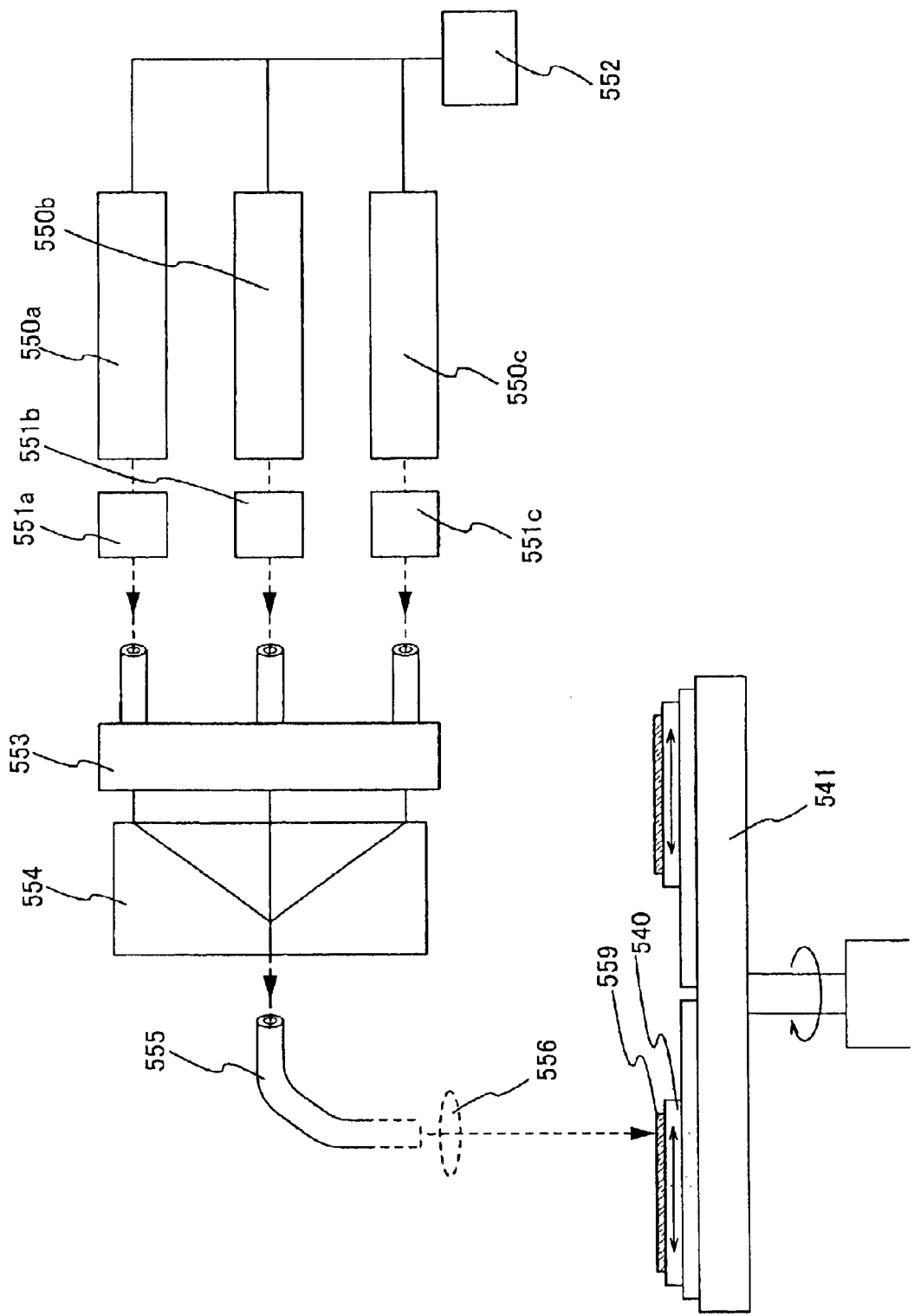
FIG. 11 is a diagram showing a structure of the laser apparatus of the present invention.

FIG. 11 shows a structure of the laser apparatus of this embodiment. The laser apparatus of this embodiment uses a plurality of oscillation apparatuses and collects a plurality of laser lights oscillated from the plurality of oscillation apparatuses into one laser light. Note that, in this embodiment, there is described a case as an example where three oscillation apparatuses 500 (550a, 550b, and 550c) are used.

Oscillation of the laser light from each oscillation apparatus can be freely controlled by a controller 552. Among the three oscillation apparatuses 550, at least in one apparatus, the laser light outputted is converted to a second harmonic wave, a third harmonic wave, and a fourth harmonic wave by a nonlinear optical element. In this embodiment, the wave lengths of the laser lights outputted from all the oscillation apparatuses 550 are converted by nonlinear optical elements 551a, 551b and 551c. The wavelengths to be converted may be the same or any one of them may be different.

The laser lights outputted from the three oscillation apparatuses 550 are synthesized into one laser light. More specifically, in this embodiment, the respective laser lights are made to enter a waveguide 554 through a fiber array 553 corresponding to each laser light and are collected into one laser light. It is possible to perform this synthesis using a thin film polarizer (TFP) or other light polarizers.

The laser light synthesized via the waveguide 554 is made to enter an optical fiber 555 again, thereby reducing diffusion of the laser light. The laser light emitted from the optical fiber 555 is condensed by a convex lens 556 and reaches an object to be processed 559 set up on a stage 540.

The synthesized laser light as one laser light has an energy density corresponding to the laser light oscillated from a high output laser. In addition, while the laser lights oscillated from the same laser are high in coherence, the laser lights oscillated from the different lasers do not interfere. Thus, the laser light obtained by collecting a plurality of laser lights, in which the lights complement with each other, is capable of reducing interference. The nonlinear optical element used for converting the laser light into a harmonic wave is required to have sufficient heat resistance and durability because the laser light transmits. The higher the laser outputs, the larger the degradation in the nonlinear optical element is. Therefore, even if the energy of the laser light that transmits is slightly smaller, lifetime of the nonlinear optical element is lengthened, thereby reducing cost. This embodiment in which one laser beam is made after wavelength of a plurality of laser beams are converted by a plurality of nonlinear optical elements can reduce the work of nonlinear optical elements in comparison with the method in which one laser beam is made after wavelength of a plurality of laser beams are converted by one nonlinear optical element. Therefore the life of each nonlinear optical elements can be longer, and the cost can be smaller.

Then, it is possible to irradiate such a laser light on the overall surface of the object to be processed using the optical systems such as an optical fiber, a galvanometer, and a polygonmeter.

A shape of the laser light on the irradiation surface differs depending on the types of the laser. The shape can be formed by the optical system. For example, the shape of the laser light emitted from an XeCl excimer laser (wavelength 308 nm, pulse width 30 ns) L3308 made by Lambda K. K. is a rectangle of 10 mm×30 mm (both are half-width in a beam profile). Further, the shape of the laser light emitted from the YAG laser is circular-shaped when a rod is cylindrical-shaped, and rectangular-shaped when the rod is a slab. It is possible to obtain the laser light having a desired size by further forming such a laser light through the optical system.

Further, in the case where the laser light is made to enter vertically the substrate which the object to be processed has, a part of the laser light reflects on the surface of the substrate and returns on the same light path that the light followed at the time of entering. That is, a so-called return light occurs. The return light exerts a harmful influence such as variation of the output or the frequency of the laser, and destruction of the rod. Therefore, it is preferable to set up an isolator in order to remove the return light and stabilize oscillation of the laser.

On the other hand, in order to prevent the return light, it is possible to make the laser light enter obliquely the substrate. However, since the laser light is high in directivity and energy density, it is preferable that a damper is set up in order to prevent the reflected light from irradiating an inappropriate portion, thereby absorbing the reflected light. Note that a cooling water circulates through the damper, whereby the temperature of the damper is prevented from rising due to absorption of the reflected light.

Then, the stage 540 is linearly moved on the rotating body 541 and the rotating body 541 is rotated using as a center a point existing on an extension of a locus where the stage 540 moved. As a result, the irradiation position of the laser light on an object to be processed 559 is moved, thereby being capable of treating the overall surface of the object to be processed 559.

It is possible to implement this embodiment combined with Embodiments 1 to 5.

(Embodiment 8)

In this embodiment, an explanation is made for the oscillation apparatus of the laser light and other optical systems used in the laser apparatus of the present invention.

Figure 12:
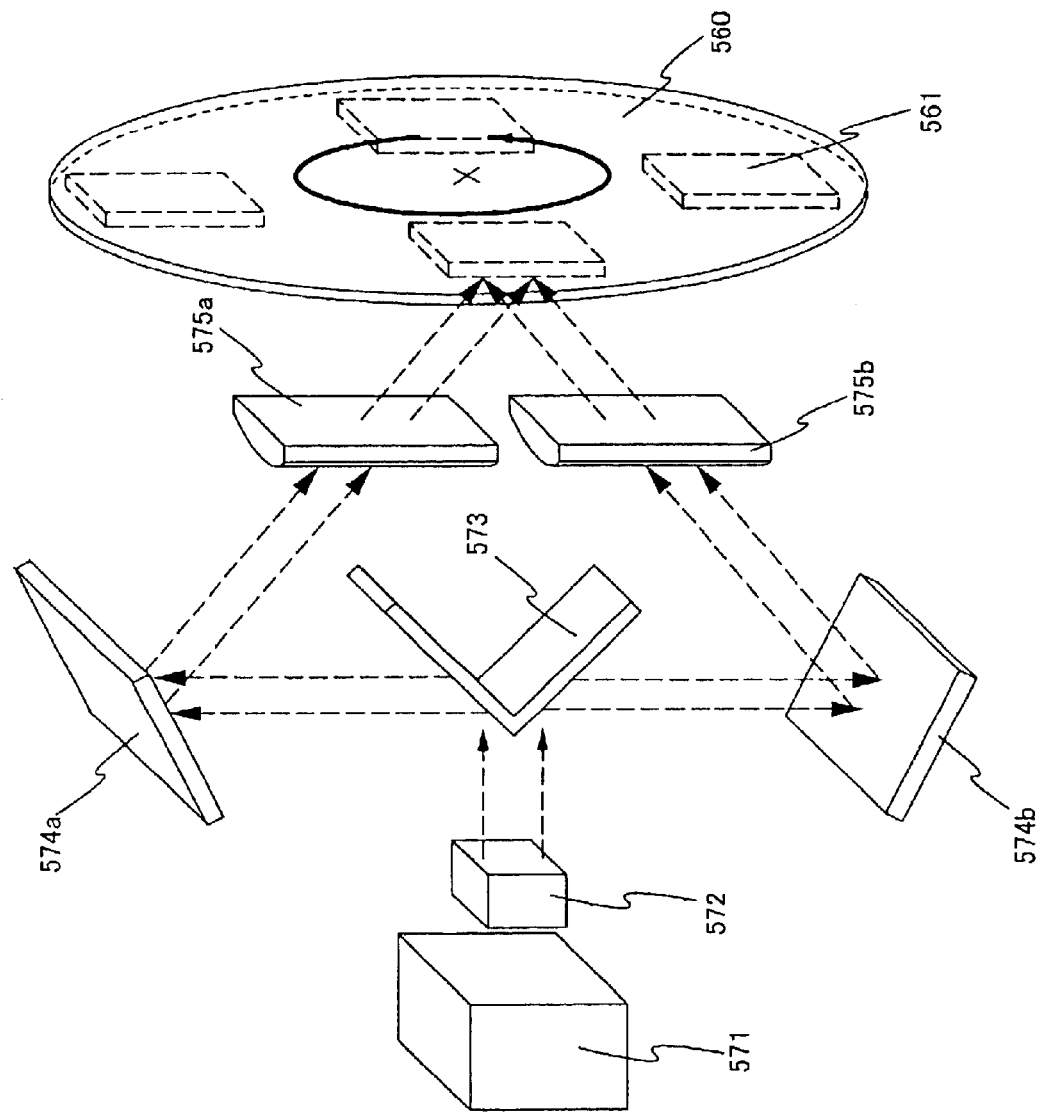
FIG. 12 is a diagram showing a structure of the laser apparatus of the present invention.

FIG. 12 shows a structure of the laser apparatus of this embodiment. In the laser apparatus of this embodiment, the laser light oscillated from the oscillation apparatus 571 is converted to a harmonic wave by the nonlinear optical element 572 and divided into a plurality of laser lights by a mirror 573 as dividing means.

The respective laser lights are reflected by mirrors 574a and 574b as forming means of the laser light having the periodic energy distribution. Then, they are condensed by cylindrical lenses 575a and 575b and reach an object to be processed 561 set up on a stage (not shown in this embodiment). In the object to be processed 561, there is caused interference by synthesizing a plurality of laser lights, whereby the laser light having a periodic energy distribution is formed. The cylindrical lenses 575a and 575b are not necessarily set up, but it is possible to enhance energy density on the irradiation surface by setting up these lenses.

Note that a shape of the laser light emitted from the laser differs depending on the types of the laser. It is circular-shaped when the rod is cylindrical-shaped, and rectangular-shaped when the rod is a slab.

Then, the stage is linearly moved on a rotating body 560 and the rotating body 560 is rotated using as a center a point existing on an extension of the locus where the stage moved. As a result, the irradiation position of the laser light on the object to be processed 561 is moved, thereby being capable of treating the overall surface of the object to be processed 561.

It is possible to implement this embodiment combined with Embodiments 1 to 5.

(Embodiment 9)

In this embodiment, a method of manufacturing an active matrix substrate will be described with reference to FIGS. 13 through 15. A substrate on which a CMOS circuit, a driver circuit, and a pixel portion having a pixel TFT and a holding capacity are formed together is called active matrix substrate for convenience.

First of all, a substrate 600 formed of glass such as barium borosilicate glass and aluminum borosilicate glass is used in this embodiment. The substrate 600 may be a quartz substrate, a silicon substrate, a metal substrate or stainless substrate, which has an insulating film on the surface. The substrate 600 may be a plastic substrate having heat resistance, which withstands a processing temperature in this embodiment.

Next, a base film 601 having an insulating film such as silicon oxide film, silicon nitride film, and a silicon oxynitride film is formed on the substrate 600 by publicly known method (such as the sputtering method, LPCVD method and plasma CVD method). In this embodiment, a two-layer structure is used for the base film 601. However, a structure may be used where a single layer film, which is the insulating film itself, or at least two layers are stacked.

Next, semiconductor layers 602 to 606 are formed on the base film 600. First of all, semiconductor layers 602 to 606 are formed with a thickness of 25 to 80 nm (preferably 30 to 60 nm) by publicly known method (such as the sputtering method, LPCVD method and plasma CVD method). Then, the semiconductor film is crystallized by laser crystallization method. The laser crystallization method is performed by using the laser apparatus of the present invention. Of course, in addition to the laser crystallization method, the semiconductor film may be crystallized by combining other publicly known crystallization method (such as thermal crystallization method using RTA or a furnace annealing and thermal crystallization method using a metal element facilitating the crystallization). Patterning is performed on the obtained crystalline semiconductor film in a desired shape in order to form the semiconductor layers 602 to 606. The semiconductor film may be an amorphous semiconductor film, a fine crystal semiconductor film or a crystalline semiconductor film. Alternatively, the semiconductor film may be a compound semiconductor film having an amorphous structure such as an amorphous silicon germanium film.

As a laser oscillation device, excimer laser of pulse oscillation type or continuous emission type or YAG laser, $YVO_4$ laser are used. While the conditions for crystallization are selected appropriately by operator, pulse oscillation frequency is set at 300 Hz and a laser energy density is set at 100 to 400 $mJ/cm^2$ (typically, at 200 to 300 $mJ/cm^2$) in the case of using an excimer laser. Alternatively, in the case of using a YAG laser, it is preferable to use the second higher harmonic wave while the pulse oscillation frequency is set at 30 to 300 kHz with the laser energy density being set at 300 to 600 $mJ/cm^2$ (typically 350 to 500 $mJ/cm^2$). It may be performed to irradiate linearly corrected laser light with a width of 100 to 1000 µm, e.g., 400 µm, over the entire surface of the substrate while the overlapping ratio of linear laser beams at this time is set at 50 to 90%.

Note that, a gas laser or solid-state laser of continuous oscillation type or pulse oscillation type can be used. The gas laser such as an excimer laser, Ar laser, Kr laser and the solid-state laser such as YAG laser, $YVO_4$ laser, YLF laser, $YAlO_3$ laser, glass laser, ruby laser, alexandrite laser, Ti:sapphire laser, $Y_2O_3$ laser can be used as the laser beam. Also, crystals such as YAG laser, $YVO_4$ laser, YLF laser, $YAlO_3$ laser wherein Cr, Nd, Er, Ho, Ce, Co, Ti, Yb or Tm is doped can be used as the solid-state laser. A basic wave of the lasers is different depending on the materials of doping, therefore a laser beam having a basic wave of approximately 1 µm is obtained. A harmonic corresponding to the basic wave can be obtained by the using non-linear optical elements.

When a crystallization of an amorphous semiconductor film is conducted, it is preferable that the second harmonic through the fourth harmonic of basic waves is applied by using the solid state laser which is capable of continuous oscillation in order to obtain a crystal in large grain size. Typically, it is preferable that the second harmonic (with a wavelength of 532 nm) or the third harmonic (with a wavelength of 355 nm) of an Nd: $YVO_4$ laser (basic wave of 1064 nm) is applied. Specifically, laser beams emitted from the continuous oscillation type $YVO_4$ laser with 10 W output is converted into a harmonic by using the non-linear optical elements. Also, a method of emitting a harmonic by applying crystal of $YVO_4$ and the non-linear optical elements into a resonator. Then, more preferably, the laser beams are formed so as to have a rectangular shape or an elliptical shape by an optical system, thereby irradiating a substance to be treated. At this time, the energy density of approximately 0.01 to 100 $MW/cm^2$ (preferably 0.1 to 10 $MW/cm^2$) is required. The semiconductor film is moved at approximately 10 to 2000 cm/s rate relatively corresponding to the laser beams so as to irradiate the semiconductor film.

The semiconductor layers 602 to 606 are formed by performing patterning processing thereon using a photolithography method.

After the semiconductor layers 602 to 606 are formed, a small amount of impurity element (boron or phosphorus) may be doped in order to control a threshold value of the TFT.

Next, a gate insulating film 607 covering the semiconductor layers 602 to 606 is formed. The gate insulating film 607 is formed by using an insulating film containing silicon with a thickness of 40 to 150 nm by using plasma CVD method or sputtering method. In this embodiment, a silicon oxynitride film (compositional ratio: Si=32%, O=59%, N=7% and H=2%) with a thickness of 110 nm is formed by the plasma CVD method. Notably, the gate insulating film is not limited to the silicon oxynitride film but an insulating film containing other silicon may be used as a single layer or as a laminated pad.

When a silicon oxide film is used, it is formed by mixing Tetraethyl Orthosilicate (TEOS) and $O_2$ by plasma CVD method, which is discharged under a condition with reaction pressure of 40 Pa, a substrate temperature of 300 to 400° C. and high frequency (13.56 MHz) power density of 0.5 to 0.8 $W/cm^2$. Thermal annealing at 400 to 500° C. thereafter can give good characteristics to the silicon oxide film produced in this way as a gate insulating film.

Next, a first conductive film 608, which is 20 to 100 nm in thickness, and a second conductive film 609, which is 100 to 400 nm in thickness, is stacked on the gate insulating film 607. In this embodiment, the first conductive film 608 formed by a TaN film with a thickness of 30 nm and the second conductive film 609 formed by a W film with a thickness of 370 nm are stacked. The TaN film is formed by using Ta target to perform sputtering in an atmosphere containing nitrogen. The W film is formed by using W target to perform sputtering. Alternatively, it can be formed by thermal CVD method using tungsten hexafluoride ($WF_6$). In both cases, the use of the gate electrode needs low resistance. Therefore, the resistivity of the W film is desirably 20 $\mu\Omega$cm or less. The low resistance of the W film can be achieved by increasing the size of the crystal grains. However, when the W film contains a large amount of impurity element such as oxygen, the crystallization is inhibited, which raises the resistance. Accordingly, in this embodiment, the W film is formed by the sputtering method using high purity (purity of 99.9999%) W target and by taking the prevention of intrusion of impurity from a vapor phase during the film forming into special consideration. Thus, the resistivity of 9 to 20 $\mu\Omega$cm can be achieved.

While, in this embodiment, the first conductive film 608 is TaN and the second conductive film 609 is W, they are not limited in particular. Both of them can be formed by an element selected from Ta, W, Ti, Mo, Al, Cu, Cr and Nd or an alloy material or a compound material mainly containing the element. Alternatively, a semiconductor film, such as a polycrystalline silicon film to which an impurity element such as phosphorus is doped, can be used. An AgPdCu alloy may be used. A combination of the first conductive film formed by a tantalum (Ta) film and the second conductive film formed by a W film, a combination of the first conductive film formed by a tantalum nitride (TiN) film and the second conductive film formed by a W film, a combination of the first conductive film formed by a tantalum nitride (TaN) film and the second conductive film formed by a W film, a combination of the first conductive film formed by a tantalum nitride (TaN) film and the second conductive film formed by an Al film, or a combination of the first conductive film formed by a tantalum nitride (TaN) film and the second conductive film formed by a Cu film is possible.

Further, the present invention is not limited to a two-layer structure. For example, a three-layer structure may be adopted in which a tungsten film, an alloy film of aluminum and silicon (Al—Si), and a titanium nitride film are sequentially laminated. Moreover, in case of a three-layer structure, tungsten nitride may be used in place of tungsten, an alloy film of aluminum and titanium (Al—Ti) may be used in place of the alloy film of aluminum and silicon (Al—Si), and a titanium film may be used in place of the titanium nitride film.

Note that, it is important that appropriate etching method or kinds of etchant is properly selected depending on the materials of a conductive film.

Next, masks 610 to 615 made of resist using photolithography method are formed, and first etching processing is performed thereon in order to form electrodes and wires. The first etching processing is performed under first and second etching conditions (FIG. 13B). The first etching condition in this embodiment is to use Inductively Coupled Plasma (ICP) etching and to use $CF_4$ and $Cl_2$ and $O_2$ as an etching gas, whose amount of gases are 25/25/10 (sccm), respectively. 500 W of RF (13.56 MHz) power was supplied to a coil type electrode by 1 Pa pressure in order to generate plasma and then to perform etching. 150 W of RF (13.56 MHz) power was also supplied to a substrate side (test sample stage) and substantially negative self-bias voltage was applied. The W film was etched under the first etching condition so as to obtain the end of the first conductive layer in a tapered form.

After that, the first etching condition is shifted to the second etching condition without removing the masks 610 to 615 made of resist. Then, $CF_4$ and $Cl_2$ are used as etching gases. The ratio of the amounts of flowing gasses is 30/30 (sccm). 500 W of RF (13.56 MHz) power is supplied to a coil type electrode by 1 Pa pressure in order to generate plasma and then to perform etching for amount 30 seconds. 20 W of RF (13.56 MHz) power is also supplied to a substrate side (test sample stage) and substantially negative self-bias voltage is applied. Under the second etching condition where $CF_4$ and $Cl_2$ are mixed, both W film and TaN film were etched to the same degree. In order to etch without leaving a residue on the gate insulating film, the etching time may be increased 10 to 20% more.

In the first etching processing, when the shape of the mask made of resist is appropriate, the shape of the ends of the first and the second conductive layers are in the tapered form due to the effect of the bias voltage applied to the substrate side. The angle of the tapered portion is 15 to 45°. Thus, conductive layers 617 to 622 in a first form are formed which include the first conductive layers and the second conductive layers (first conductive layers 617a to 622a and second conductive layer 617b to 622b) through the first etching processing. In a gate insulating film 616, an area not covered by the conductive layers 617 to 622 in the first form is etched by about 20 to 50 nm so as to form a thinner area.

Next, second etching processing is performed without removing masks made of resist (FIG. 13C). Here, $CF_4$, $Cl_2$ and $O_2$ are used as an etching gas to etch the W film selectively. Then, second conductive layers 628b to 633b are formed by the second etching processing. On the other hand, the first conductive layers 617a to 622a are not etched very much, and conductive layers 628 to 633 in the second form are formed.

First doping processing is performed without removing masks made of resist and low density of impurity element, which gives n-type to the semiconductor layer, is added. The doping processing may be performed by the ion-doping method or the ion-implanting method. The ion doping method is performed under a condition in the dose of $1 \times 10^{13}$ to $5 \times 10^4$ atoms/cm² and the accelerating voltage of 40 to 80 kV. In this embodiment, the ion doping method is performed under a condition in the dose of $1.5 \times 10^{13}$ atoms/cm² and the accelerating voltage of 60 kV. The n-type doping impurity element may be Group 15 elements, typically phosphorus (P) or arsenic (As). Here, phosphorus (P) is used. In this case, the conductive layers 628 to 633 function as masks for the n-type doping impurity element. Therefore, impurity areas 623 to 627 are formed in the self-alignment manner. An n-type doping impurity element in the density range of $1 \times 10^{18}$ to $1 \times 10^{20}$ atoms/cm³ are added to the impurity areas 623 to 627.

When masks made of resist are removed, new masks 634a to 634c made of resist are formed. Then, second doping processing is performed by using higher accelerating voltage than that used in the first doping processing. The ion doping method is performed under a condition in the dose of $1 \times 10^{13}$ to $1 \times 10^{15}$ atoms/cm² and the accelerating voltage of 60 to 120 kV In the doping processing, the second conductive layers 628b to 632b are used as masks against the impurity element. Doping is performed such that the impurity element can be added to the semiconductor layer at the bottom of the tapered portion of the first conductive layer. Then, third doping processing is performed by having lower accelerating voltage than that in the second doping processing to obtain a condition shown in FIG. 14A. The ion doping method is performed under a condition in the dose of $1 \times 10^{15}$ to $1 \times 10^{17}$ atoms/cm² and the accelerating voltage of 50 to 100 kV. Through the second doping processing and the third doping processing, an n-type doping impurity element in the density range of $1 \times 10^{18}$ to $5 \times 10^{19}$ atoms/cm³ is added to the low density impurity areas 636, 642 and 648, which overlap with the first conductive layer. An n-type doping impurity element in the density range of $1 \times 10^{19}$ to $5 \times 10^{21}$ atoms/cm³ is added to the high density impurity areas 635, 641, 644 and 647.

With proper accelerating voltage, the low density impurity area and the high density impurity area can be formed by performing the second doping processing and the third doping processing once.

Next, after removing masks made of resist, new masks 650a to 650c made of resist are formed to perform the fourth doping processing. Through the fourth doping processing, impurity areas 653, 654, 659 and 660, to which an impurity element doping a conductive type opposite to the one conductive type is added, in a semiconductor layer, which is an active layer of a p-channel type TFT. Second conductive layers 628a to 632a are used as mask against the impurity element, and the impurity element giving p-type is added so as to form impurity areas in the self-alignment manner. In this embodiment, the impurity areas 653, 654, 659 and 660 are formed by applying ion-doping method using diborane ($B_2H_6$) (FIG. 14B). During the fourth doping processing, the semiconductor layer forming the n-channel TFT is covered by masks 650a to 650c made of resist. Thorough the first to the third doping processing, phosphorus of different densities is added to each of the impurity areas 653, 654, 659 and 660. Doping processing is performed such that the density of p-type doping impurity element can be $1 \times 10^{19}$ to $5 \times 10^{21}$ atoms/cm³ in both areas. Thus, no problems are caused when they function as the source region and the drain region of the p-channel TFT.

Impurity areas are formed in the semiconductor layers, respectively, through the processes above.

Next, the masks 650a to 650c made of resist are removed and a first interlayer insulating film 661 is formed thereon. The first interlayer insulating film 661 may be an insulating film with a thickness of 100 to 200 nm containing silicon, which is formed by plasma CVD method or sputtering method. In this embodiment, silicon oxynitride film with a thickness of 150 nm is formed by plasma CVD method. The first interlayer insulating film 661 is not limited to the silicon oxynitride film but may be the other insulating film containing silicon in a single layer or in a laminated pad.

Next, as shown in FIG. 14C, activation processing is performed by using laser irradiation method. When a laser annealing method is used, the laser used in the crystallization can be used. When the activation processing is performed, the moving speed is same as the crystallization, and an energy density of about 0.01 to 100 MW/cm² (preferably, 0.01 to 10 MW/cm²) is required. Also, a continuous oscillation laser may be used in the case the crystallization is performed and a pulse oscillation laser may be used in the case the activation is performed.

Also, the activation processing may be conducted before the first interlayer insulating film is formed.

After the heating processing (thermal processing at 300 to 550° C. for 1 to 12 hours) is performed, hydrogenation can be performed. This process terminates the dangling bond of the semiconductor layer with hydrogen contained in the first interlayer insulating film 661. Alternatively, the hydrogenation may be plasma hydrogenation (using hydrogen excited by plasma) or heating processing in an atmosphere containing 3 to 100% of hydrogen at 300 to 650° C. for 1 to 12 hours. In this case, the semiconductor layer can be hydrogenated regardless of the existence of the first interlayer insulating film.

Next, a second interlayer insulating film 662 formed by an inorganic insulating material or an organic insulator material is formed on the first interlayer insulating film 661. In this embodiment, an acrylic resin film with a thickness of 1.6 μm is formed, whose viscosity is 10 to 1000 cp, preferably 40 to 200 cp and which may have depressions and projections formed on the surface.

In this embodiment, in order to prevent mirror reflection, a second interlayer insulating film having projections and depressions on the surface is formed. Thus, the projections and depressions are formed on the surface of the pixel electrode. In order to obtain an effect of light dispersion by forming the depressions and projections on the surface of the pixel electrode, a projecting portion may be formed under the pixel electrode. In this case, the projecting portion can be formed by using the same photomask for forming a TFT. Thus, the projecting portion can be formed without any increase in the number of steps. The projecting portion may be provided as necessary on the substrate in the pixel area except for wirings and the TFT portion. Accordingly, projections and depressions can be formed on the surface of the pixel electrode along the projections and depressions formed on the surface of an insulating film covering the projecting portion.

Alternatively, the second interlayer insulating film 662 may be a film having a flattened surface. In this case, after the pixel electrode is formed, projections and depressions are formed on the surface by performing an added process such as publicly known sand-blast method and etching method. Preferably, by preventing mirror reflection and by dispersing reflected light, the whiteness is increased.

Wirings 664 to 668 electrically connecting to impurity areas, respectively, are formed in a driver circuit 686. These wirings are formed by patterning a film laminating a Ti film with a thickness of 50 nm and an alloy film (alloy film of Al and Ti) with a thickness of 500 nm. It is not limited to the two-layer structure but may be a one-layer structure or a laminate pad including three or more layers. The materials of the wirings are not limited to Al and Ti. For example, the wiring can be formed by forming Al or Cu on a TaN film and then by patterning the laminate film in which a Ti film is formed (FIG. 15).

In a pixel portion 687, a pixel electrode 670, a gate wiring 669 and a connecting electrode 668 are formed. Source wirings (a laminate of layers 643a and 643b) are electrically connected with a pixel TFT by the connecting electrode 668. The gate wiring 669 is electrically connected with a gate electrode of the TFT pixel. A pixel electrode 670 is electrically connected with a drain region 690 of the pixel TFT. Furthermore, the pixel electrode 670 is electrically connected with a semiconductor layer 658 functioning as one electrode forming a storage capacitor. Desirably, a material having excellent reflectivity such as a film mainly containing Al or Ag or the laminate film is used for the pixel electrode 670.

In this way, the driver circuit 686 having a CMOS circuit including an n-channel TFT 681 and a p-channel TFT 682 and a n-channel TFT 683, and the pixel portion 687 having the pixel TFT 684 and the storage capacitor 685 can be formed on the same substrate. Thus, an active matrix substrate is completed.

The n-channel TFT 681 of the driver circuit 686 has a channel forming region 637, a low density impurity area 636 overlapping with the first conductive layer 628a, which constructs a part of the gate electrode (GOLD area), and a high density impurity area 652 functioning as the source region or the drain region are implanted. The p-type channel TFT 682 forming a CMOS circuit together with the n-channel TFT 681, which are connected by an electrode 666, has a channel forming region 640, a high density impurity area 653 functioning as the source region or the drain region, and an impurity area 654 to which a p-type doping impurity element are implanted. The n-channel TFT 683 has a channel forming region 643, a low density impurity area 642 overlapping with the first conductive layer 630a, which constructs a part of the gate electrode, (GOLD area), and a high density impurity area 656 functioning as the source region or the drain region.

The pixel TFT 684 of the pixel portion has a channel forming region 646, a low density impurity area 645 formed outside of the gate electrode (LDD region) and a high density impurity area 658 functioning as the source region or the drain region. An n-type doping impurity element and a p-type doping impurity element are added to a semiconductor layer functioning as one electrode of the storage capacitor 685. The storage capacitor 685 is formed by an electrode (a laminate of layers 632a and 632b) and a semiconductor layer by using the insulating film 616 as a dielectric.

The pixel structure in this embodiment is arranged such that light can be blocked in a space between pixel electrodes and the ends of the pixel electrodes can overlap with the source wiring without using the black matrix.

Present invention can be implemented by combining with Embodiments 1 to 8.

(Embodiment 10)

Figure 16:
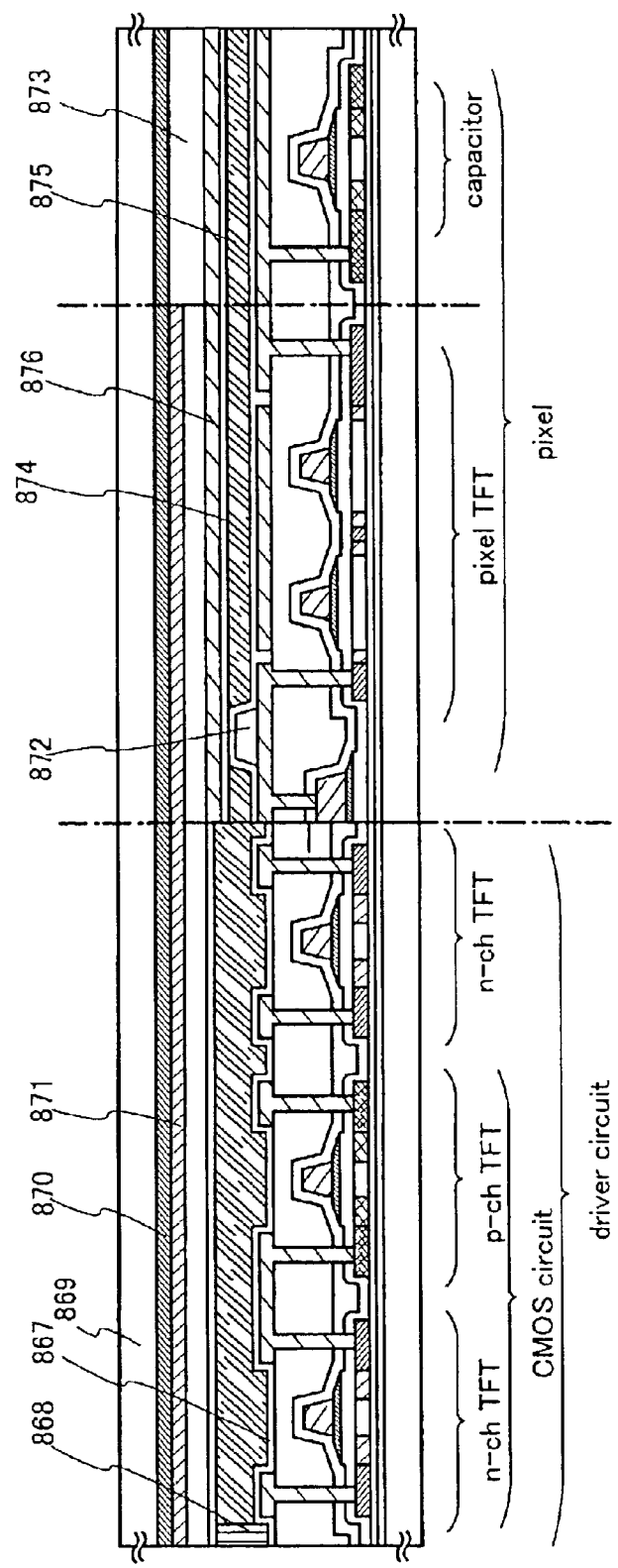
FIG. 16 is a diagram showing a manufacturing method for the semiconductor device using the laser apparatus of the present invention.

This embodiment explains, below, a process to manufacture a reflection type liquid crystal display device from the active matrix substrate made in Embodiment 9, using FIG. 16.

Figure 15:
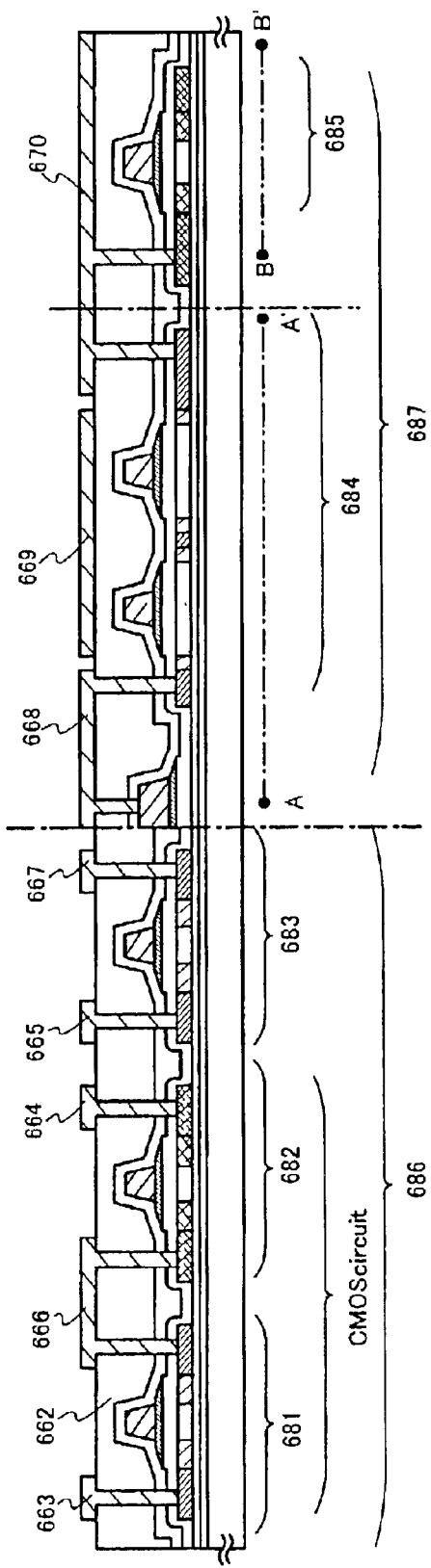
FIG. 15 is a diagram showing a manufacturing method for the semiconductor device using the laser apparatus of the present invention.

First, after obtaining an active matrix substrate in the state of FIG. 15 according to Embodiment 9, an orientation film 867 is formed at least on the pixel electrodes 670 on the active matrix substrate of FIG. 15 and subjected to a rubbing process. Incidentally, in this embodiment, prior to forming an orientation film 867, an organic resin film such as an acryl resin film is patterned to form columnar spacers 872 in a desired position to support the substrates with spacing. Meanwhile, spherical spacers, in place of the columnar spacers, may be distributed over the entire surface of the substrate.

Then, a counter substrate 869 is prepared. Then, coloring layers 870, 871 and a planarizing film 873 are formed on a counter substrate 869. A shade portion is formed by overlapping a red coloring layer 870 and a blue coloring layer 871 together. Meanwhile, the shade portion may be formed by partly overlapping a red coloring layer and a green coloring layer.

In this embodiment is used a substrate shown in Embodiment 9. There is a need to shade at least the gap between the gate wiring 669 and the pixel electrode 670, the gap between the gate wiring 669 and the connecting electrode 668 and the gap between the connecting electrode 668 and the pixel electrode 670. In this embodiment were bonded together the substrates by arranging the coloring layers so that the shading portion having a lamination of coloring layers is overlapped with the to-be-shading portion.

In this manner, the gaps between the pixels are shaded by the shading portion having a lamination of coloring layers without forming a shading layer such as a black mask, thereby enabling to reduce the number of processes.

Then, a counter electrode 876 of a transparent conductive film is formed on the planarizing film 873 at least in the pixel portion. An orientation film 874 is formed over the entire surface of the counter substrate and subjected to a rubbing process.

Then, the active matrix substrate formed with the pixel portion and driver circuit and the counter substrate are bonded together by a seal member 868. The seal member 868 is mixed with filler so that the filler and the columnar spacers bond together the two substrates through an even spacing. Thereafter, a liquid crystal material 875 is poured between the substrates, and completely sealed by a sealant (not shown). The liquid crystal material 875 may be a known liquid crystal material. In this manner, completed is a reflection type liquid crystal display device shown in FIG. 16. If necessary, the active matrix substrate or counter substrate is divided into a desired shape. Furthermore, a polarizing plate (not shown) is bonded only on the counter substrate. Then, an FPC is bonded by a known technique.

The liquid crystal display device manufactured as above comprises TFT manufactured by a semiconductor film, wherein a laser beam having a periodic or uniform energy distribution is irradiated and a crystal grain with a large grain size is formed. Thus, the liquid crystal display device ensures a good operational characteristic and high reliability. The liquid crystal display device can be used as a display portion for an electronic appliance in various kinds.

Incidentally, this embodiment can be implemented by combining with Embodiments 1 to 9.

(Embodiment 11)

This embodiment explains an example of manufacturing a light emitting device by using a method of manufacturing TFT when an active matrix substrate is fabricated in the Embodiment 9. In this specification, the light-emitting device refers, generally, to the display panel having light-emitting elements formed on a substrate sealed between the substrate and a cover member, and the display module having TFTs or the like mounted on the display panel. Incidentally, the light emitting element has a layer including an organic compound that electroluminescence caused is obtained by applying an electric field (light emitting layer), an anode layer and a cathode layer. Meanwhile, the electroluminescence in compound includes the light emission upon returning from the singlet-excited state to the ground state (fluorescent light) and the light emission upon returning from the triplet-excited state to the ground state (phosphorous light), including any or both of light emission.

Note that, all the layers that are provided between an anode and a cathode in a light emitting element are defined as an organic light emitting layer in this specification. Specifically, the organic light emitting layer includes a light emitting layer, a hole injection layer, an electron injection layer, a hole transporting layer, an electron transporting layer, etc. A basic structure of a light emitting element is a laminate of an anode layer, a light emitting layer, and a cathode layer layered in this order. The basic structure can be modified into a laminate of an anode layer, a hole injection layer, a light emitting layer, and a cathode layer layered in this order, or a laminate of an anode layer, a hole injection layer, a light emitting layer, an electron transporting layer, and a cathode layered in this order.

Figure 17:
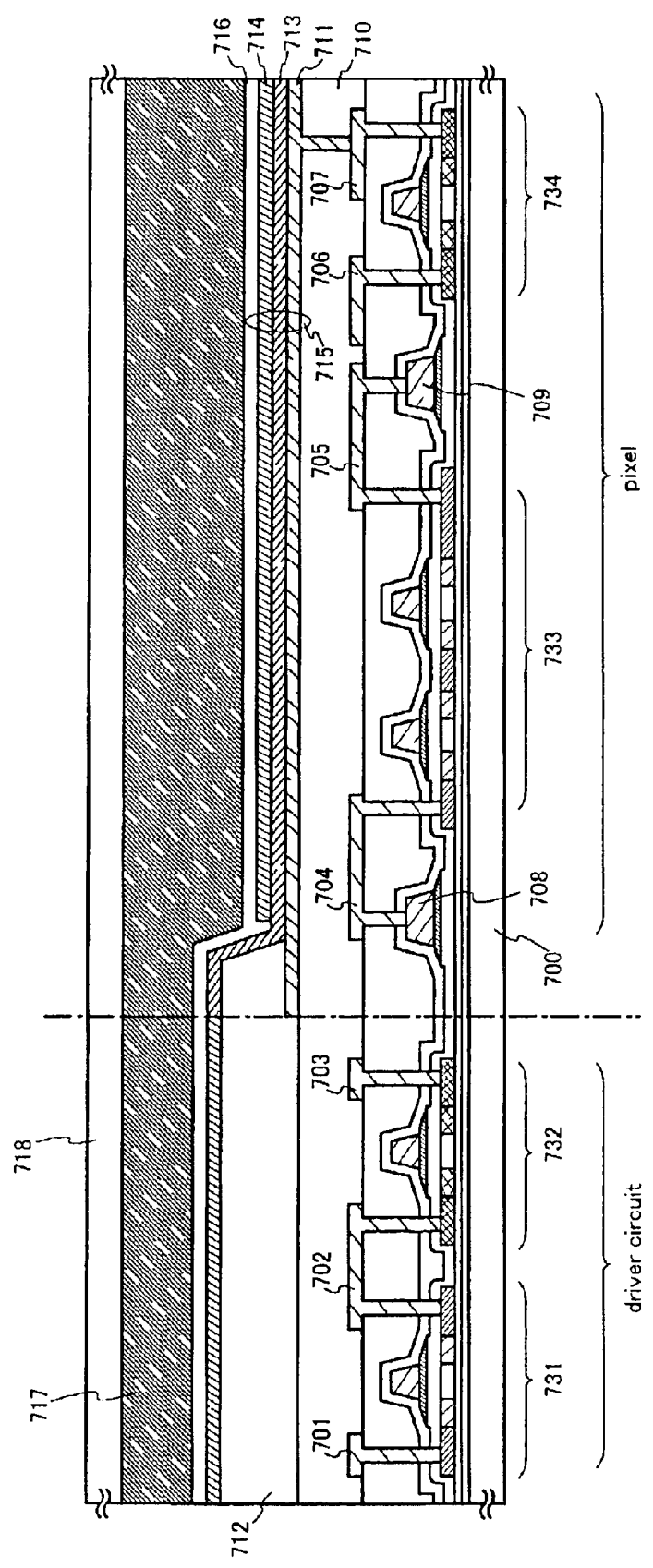
FIG. 17 is a diagram showing a manufacturing method for the semiconductor device using the laser apparatus of the present invention.

FIG. 17 is a sectional view of a light-emitting device of this embodiment. In FIG. 17, the switching TFT 733 provided on the substrate 700 is formed by using the manufacturing method in Embodiment 9.

Incidentally, although this embodiment is of a double gate structure formed with two channel forming regions, it is possible to use a single gate structure formed with one channel forming region or a triple gate structure formed with three channel forming regions.

The driver circuit provided on the substrate 700 is formed by using the manufacturing method in Embodiment 9. Incidentally, although this embodiment is of a single gate structure, it is possible to use a double gate structure or a triple gate structure.

Meanwhile, the wirings 701, 703 serve as source wirings of the CMOS circuit while the wiring 702 as a drain wiring. Meanwhile, a wiring 704 serves as a wiring to electrically connect between the source wiring 708 and the source region of the switching TFT while the wiring 705 serves as a wiring to electrically connect between the drain wiring 709 and the drain region of the switching TFT.

Incidentally, a current control TFT 734 is formed by using the manufacturing method in Embodiment 9. Incidentally, although this embodiment is of a single gate structure, it is possible to use a double gate structure or a triple gate structure.

Meanwhile, the wiring 706 is a source wiring of the current control TFT (corresponding to a current supply line) while the wiring 707 is an electrode to be electrically connected to the drain region.

Meanwhile, reference numeral 711 is a pixel electrode (anode of a light-emitting element) formed by a transparent conductive film. As the transparent conductive film can be used a compound of indium oxide and tin oxide, a compound of indium oxide and zinc oxide, zinc oxide, tin oxide or indium oxide. A transparent conductive film added with gallium may also be used. The pixel electrode 711 is formed on a planar interlayer insulating film 710 prior to forming the wirings. In this embodiment, it is very important to planarize the step due to the TFT by using a planarizing film 710 made of resin. A light emitting layer to be formed later, because being extremely thin, possibly causes poor light emission due to the presence of a step. Accordingly, it is desired to provide planarization prior to forming a pixel electrode so that a light emitting layer can be formed as planar as possible.

After forming the wirings 701 to 707, a bank 712 is formed as shown in FIG. 17. The bank 712 may be formed by patterning an insulating film or organic resin film containing silicon with a thickness of 100 to 400 nm.

Incidentally, because the bank 712 is an insulating film, caution must be paid to element electrostatic breakdown during deposition. In this embodiment added is a carbon particle or metal particle to an insulating film as a material for the bank 712, thereby reducing resistivity and suppressing occurrence of static electricity. In such a case, the addition amount of carbon or metal particle may be adjusted to provide a resistivity of $1\times10^6$ to $1\times10^{12}$ Ωm (preferably $1\times10^8$ to $1\times10^{10}$ Ωm).

A light emitting layer 713 is formed on the pixel electrode 711. Incidentally, although FIG. 17 shows only one pixel, this embodiment separately forms light emitting layers correspondingly to the respective colors of R (red), G (green) and B (blue). Meanwhile, in this embodiment is formed a low molecular weight organic light-emitting material by the deposition method. Specifically, this is a lamination structure having a copper phthalocyanine (CuPc) film provided with a thickness of 20 nm as a hole injecting layer and a tris-8-qyuinolinolato aluminum complex ($Alq_3$) film provided thereon with a thickness of 70 nm as a light emitting layer. The color of emission light can be controlled by adding a fluorescent pigment, such as quinacridone, perylene or DCM1, to $Alq_3$.

However, the foregoing example is an example of organic light-emitting material to be used for a light emitting layer and not necessarily limited to this. It is satisfactory to form a light emitting layer (layer for light emission and carrier movement therefore) by freely combining a light emitting layer, a charge transporting layer and a charge injection layer. For example, although in this embodiment was shown the example in which a low molecular weight organic light-emitting material is used for a light emitting layer, it is possible to use an intermediate molecular weight organic light-emitting material or high molecular weight organic light-emitting material. Note that, an organic light-emitting material, having no sublimity but having molecules in the number of 20 or less or chained molecules having a length of 10 mm or less, is provided as a intermediate molecular organic light emitting material in this specification. As an example of using high molecular electroluminescent emitting material, the laminated pad can be made polythiophene (PEDOT) films with a thickness of 20 nm is provided by spin coating method as a hole injection layer, and paraphenylene-vinylene (PPV) films with a thickness of 100 nm is provided thereon as a light emitting layer. The light emitting wave length can be selected from red through blue by using π-conjugated system high molecular of PPV. The inorganic material such as a silicon carbide can be used as a charge transporting layer and a charge injection layer. These organic light-emitting material and inorganic light-emitting material are formed by using known materials.

Next, a cathode 714 of a conductive film is provided on the light emitting layer 713. In this embodiment, as the conductive film is used an alloy film of aluminum and lithium. A known MgAg film (alloy film of magnesium and silver) may be used. As the cathode material may be used a conductive film of an element belonging to the periodic-table group 1 or 2, or a conductive film added with such an element.

A light-emitting element 715 is completed at a time having formed up to the cathode 714. Incidentally, the light-emitting element 715 herein refers to a diode formed with a pixel electrode (anode) 711, a light emitting layer 713 and a cathode 714.

It is effective to provide a passivation film 716 in such a manner to completely cover the light-emitting element 715. The passivation film 716 is formed by an insulating film including a carbon film, a silicon nitride film or a silicon oxynitride film, and used is an insulating film in a single layer or a combined lamination.

In such a case, it is preferred to use a film favorable in coverage as a passivation film. It is effective to use a carbon film, particularly DLC (diamond-like carbon) film. The DLC film, capable of being deposited in a temperature range of from room temperature to 100° C. or less, can be easily deposited over the light emitting layer 713 low in heat resistance. Meanwhile, the DLC film, having a high blocking effect to oxygen, can suppress the light emitting layer 713 from oxidizing. Consequently, prevented is the problem of oxidation in the light emitting layer 713 during the following seal process.

Furthermore, a seal member 717 is provided on the passivation film 716 to bond a cover member 718. For the seal member 717 used may be an ultraviolet curable resin. It is effective to provide therein a substance having a hygroscopic effect or an antioxidant effect. Meanwhile, in this embodiment, for the cover member 718 used is a glass substrate, quartz substrate or plastic substrate (including a plastic film) having carbon films (preferably diamond-like carbon films) formed on the both surfaces thereof.

Thus, completed is a light-emitting device having a structure as shown in FIG. 17. Incidentally, it is effective to continuously carry out, without release to the air, the process to form a passivation film 716 after forming a bank 712 by using a deposition apparatus of a multi-chamber scheme (or in-line scheme). In addition, with further development it is possible to continuously carry out the process up to bonding a cover member 718, without release to the air.

In this manner, n-channel TFTs 731, 732, a switching TFT (n-channel TFT) 733 and a current control TFT (n-channel TFT) 734 are formed on the substrate 700.

Furthermore, as was explained using FIG. 17, by providing an impurity region overlapped with the gate electrode through an insulating film, it is possible to form an n-channel TFT resistive to the deterioration resulting from hot-carrier effect. Consequently, a reliable light emitting device can be realized.

Meanwhile, this embodiment shows only the configuration of the pixel portion and driver circuit. However, according to the manufacturing process in this embodiment, besides there, it is possible to form logic circuits such as a signal division circuit, a D/A converter, an operation amplifier, a γ-correction circuit on a same insulator. Furthermore, a memory or microprocessor can be formed.

The light emitting device manufactured as above comprises TFT manufactured by a semiconductor film, wherein a laser beam having a periodic or uniform energy distribution is irradiated and a crystal grain with a large grain size is formed. Thus, the light emitting device ensures a good operational characteristic and high reliability. The light emitting device can be used as a display portion for an electronic appliance in various kinds.

Incidentally, this embodiment can be implemented by combining any one of Embodiments 1 to 9.

(Embodiment 12)

Figure 18:
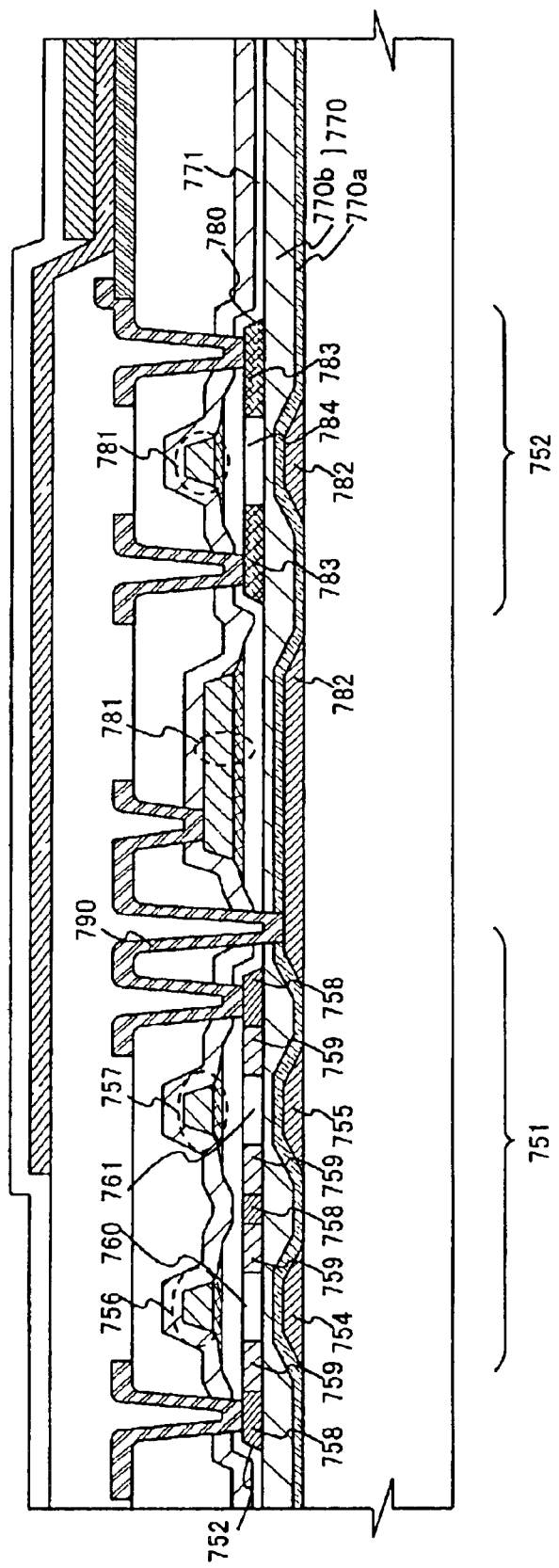
FIG. 18 is a diagram showing a manufacturing method for the semiconductor device using the laser apparatus of the present invention.

In this embodiment, an explanation is made for a structure of a pixel of a light emitting device as one of the semiconductor devices of the present invention, which is different from the structure of Embodiment 1. FIG. 18 is a sectional view of the pixel of the light emitting device of this embodiment.

Reference numeral 751 denotes an n-channel TFT and 752 denotes a p-channel TFT. The n-channel TFT 751 has a semiconductor film 753, a first insulating film 770, first electrodes 754 and 755, a second insulating film 771 and second electrodes 756 and 757. Then, the semiconductor film 753 has a one conductivity type impurity region at first concentration 758, a one conductivity type impurity region at second concentration 759, and channel forming regions 760 and 761.

The first electrodes 754 and 755 and the channel forming regions 760 and 761 overlap with the first insulating film 770 interposed therebetween, respectively. Further, the second electrodes 756 and 757 and the channel forming regions 760 and 761 overlap with the second insulating film 771 interposed therebetween, respectively.

The p-channel TFT 752 has a semiconductor film 780, first insulating films 770, a first electrode 782, a second insulating film 771 and a second electrode 781. Then, the semiconductor film 780 has one conductivity type impurity regions at third concentration 783, and a channel forming region 784.

The first electrode 782 and the channel forming region 784 overlap with the first insulating film 770 interposed therebetween. Further, the second electrode 781 and the channel forming region 784 overlap with the second insulating film 771 interposed therebetween.

The first electrode 782 and the second electrode 781 are electrically connected through a wiring 790.

The laser apparatus of the present invention can be used in the process of crystallizing and activating the semiconductor films 753 and 780 or in the process of using laser annealing and others.

In this embodiment, a TFT used as a switching element (the n-channel TFT 751 in this embodiment) applies a constant voltage to the first electrode. By applying a constant voltage to the first electrode, it is possible to suppress variation of threshold in comparison with the case where the electrode is one, and to suppress the OFF-current.

Further, a TFT which causes a larger amount of current than the TFT used as the switching element to flow (the p-channel TFT 752 in this embodiment) electrically connects the first electrode and the second electrode. By applying the same voltage to the first electrode and the second electrode, a depletion layer is expanded fast substantially as in the case of making the thickness of the semiconductor film thin. Therefore, it is possible to reduce a sub-threshold coefficient and further to increase ON-current in comparison with the case where the electrode is one. As a result, it is possible to reduce driving voltage by using the TFT having this structure as the driving circuit. Furthermore, since the ON-current can be increased, it is possible to reduce the size of the TFT (particularly, the channel width). Therefore, it is possible to enhance integration density.

Note that it is possible to implement this embodiment combined with any one of Embodiments 1 to 11.

(Embodiment 13)

Figure 19:
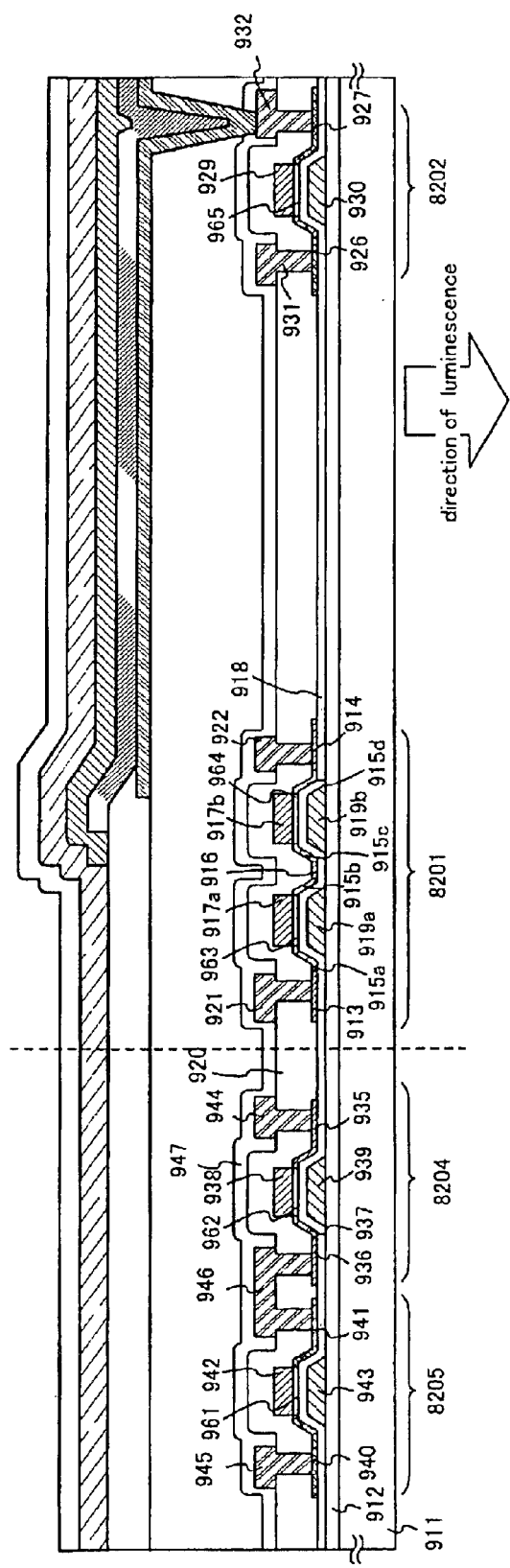
FIG. 19 is a diagram showing a manufacturing method for the semiconductor device using the laser apparatus of the present invention.
Figure 20:
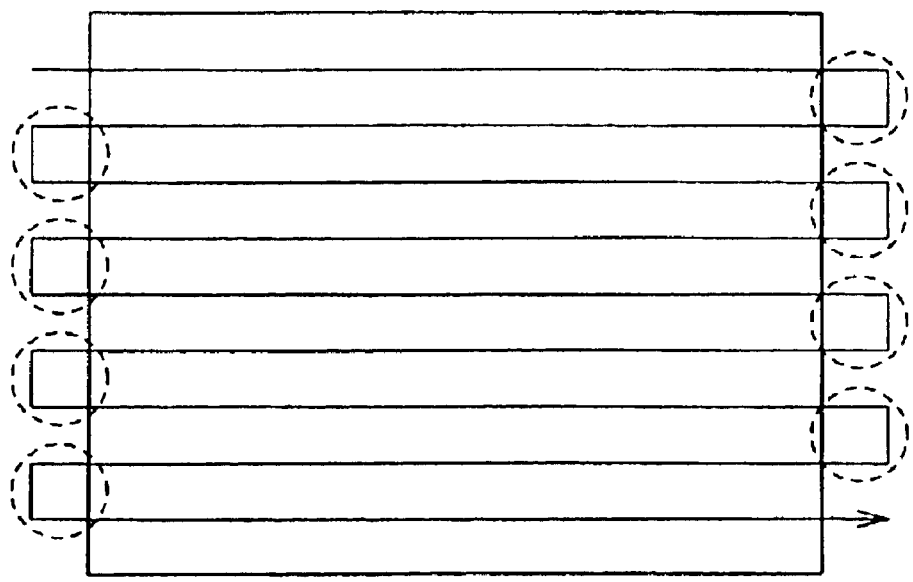
FIG. 20 is a diagram showing a moving direction of an irradiation position of a laser light in an object to be processed in a conventional example.

This embodiment will be described a configuration differing from the configurations in Embodiments 1 and 12 of pixels of a light emitting device which is one of semiconductor devices of the present invention. FIG. 19 is a sectional view of the pixels of the light emitting device in this embodiment.

Reference numeral 911 denotes a substrate and reference numeral 912 denotes an insulating film which becomes a base (hereafter referred to as a base film) in FIG. 19. A light transmitting substrate, typically a glass substrate, a quartz substrate, a glass ceramic substrate, or a crystalline glass substrate can be used as the substrate 911. However, the substrate used must be one able to withstand the highest process temperature during the manufacturing processes.

Reference numeral 8201 denotes a switching TFT, reference numeral 8202 denotes a current controlling TFT, and both are formed by n-channel TFT and p-channel TFTs respectively. When the direction of light emitted from the light emitting layer is toward the substrate lower side (surface where TFTs and the organic light emitting layer are not formed), the above structure is preferable. However, the present invention is not limited to this structure. The switching TFT and the current controlling TFT may be either n-channel TFTs or p-channel TFTs.

The switching TFT 8201 has an active layer containing a source region 913, a drain region 914, LDD regions 915a to 915d, a separation region 916, and an active layer including channel forming regions 917a and 917b, a gate insulating film 918, gate electrodes 919a and 919b, a first interlayer insulating film 920, a source signal line 921 and a drain wiring 922. Note that the gate insulating film 918 and the first interlayer insulating film 920 may be common among all TFTs on the substrate, or may differ depending upon the circuit or the element.

Furthermore, the switching TFT 8201 shown in FIG. 19 is electrically connected to the gate electrodes 917a and 917b, becoming namely a double gate structure. Not only the double gate structure, but also a multi gate structure (a structure containing an active layer having two or more channel forming regions connected in series) such as a triple gate structure, may of course also be used.

The multi gate structure is extremely effective in reducing the off current, and provided that the off current of the switching TFT is sufficiently lowered, a capacitor connected to the gate electrode of the current controlling TFT 8202 can be have its capacitance reduced to the minimum necessary. Namely, the surface area of the capacitor can be made smaller, and therefore using the multi gate structure is effective in expanding the effective light emitting surface area of the light emitting elements.

In addition, the LDD regions 915a to 915d are formed so as not to overlap the gate electrodes 919a and 919b through the gate insulating film 918 in the switching TFT 8201. This type of structure is extremely effective in reducing the off current. Furthermore, the length (width) of the LDD regions 915a to 915d may be set from 0.5 to 3.5 μm, typically between 2.0 and 2.5 μm. Further, when using a multi gate structure having two or more gate electrodes, the separation region 916 (a region to which the same impurity element, at the same concentration, as that added to the source region or the drain region, is added) is effective in reducing the off current.

Next, the current controlling TFT 8202 is formed having an active layer containing a source region 926, a drain region 927, and a channel forming region 929; the gate insulating film 918; a gate electrode 930, the first interlayer insulating film 920; a source wiring 931; and a drain wiring 932. The current controlling TFT 8202 is a p-channel TFT in this embodiment.

Further, the drain region 914 of the switching TFT 8201 is connected to the gate electrode 930 of the current controlling TFT 8202. Although not shown in the figure, specifically the gate electrode 930 of the current controlling TFT 8202 is electrically connected to the drain region 914 of the switching TFT 8201 through the drain wiring (also referred to as a connection wiring) 922. The gate electrode 930 is a single gate structure in this embodiment, however, the multi gate structure can be also applied. The source wiring 931 of the current controlling TFT 8202 is connected to an power source supply line (not shown in the figure).

The structures of the TFTs formed within the pixel are explained above, but a driver circuit is also formed simultaneously at this point. A CMOS circuit, which becomes a basic unit for forming the driver circuit, is shown in FIG. 19.

A TFT having a structure in which hot carrier injection is reduced without an excessive drop in the operating speed is used as an n-channel TFT 8204 of the CMOS circuit in FIG. 19. Note that the term driver circuit indicates a source signal line driver circuit and a gate signal line driver circuit here. It is also possible to form other logic circuit (such as a level shifter, an A/D converter, and a signal division circuit).

An active layer of the n-channel TFT 8204 of the CMOS circuit contains a source region 935, a drain region 936, an LDD region 937, and a channel forming region 962. The LDD region 937 overlaps with a gate electrode 939 through the gate insulating film 918.

Formation of the LDD region 937 on only the drain region 936 side is so as not to have drop the operating speed. Further, it is not necessary to be very concerned about the off current with the n-channel TFT 8204, and it is good to place more importance on the operating speed. Thus, it is desirable that the LDD region 937 is made to completely overlap the gate electrode to decrease a resistance component to a minimum. It is therefore preferable to eliminate so-called offset.

Furthermore, there is almost no need to be concerned with degradation of a p-channel TFT 8205 of the CMOS circuit, due to hot carrier injection, and therefore no LDD region need be formed in particular. Its active layer therefore contains a source region 940, a drain region 941, and a channel forming region 961, and a gate insulating film 918 and a gate electrode 943 are formed on the active layer. It is also possible, of course, to take measures against hot carrier injection by forming an LDD region similar to that of the n-channel TFT 8204.

The references numeral 942, 938, 917a, 917b and 929 are masks to form the channel forming regions961 to 965.

Further, the n-channel TFT 8204 and the p-channel TFT 8205 have source wirings 944 and 945, respectively, on their source regions, through the first interlayer insulating film 920. In addition, the drain regions of the n-channel TFT 8204 and the p-channel TFT 8205 are mutually connected electrically by a drain wiring 946.

The laser device of the present invention can be in the the crystallization step of the active layer, activation step, and a step using a laser annealing.

Incidentally, the configuration of the present invention can be implemented by freely combining Embodiments 1 to 11.

(Embodiment 14)

In this embodiment, an explanation is made for a case of removing an impurity mixed in the semiconductor film melted when the semiconductor film is crystallized by laser light irradiation. Hereinafter, there is briefly described a typical manufacturing process with reference to FIGS. 21A and 21G.

Figure 21A:
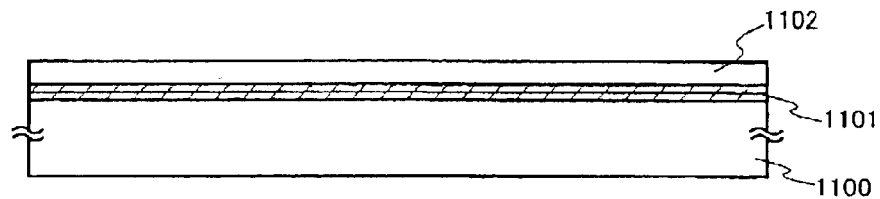
FIGS. 21A to 21G are diagrams showing a manufacturing method of the semiconductor device using the laser apparatus of the present invention.

In FIG. 21A, reference numeral 1100 denotes a substrate having an insulating surface, 1101 denotes a base insulating film and 1102 denotes a semiconductor film having an amorphous structure.

First, on the substrate 1100, the base insulating film 1101 comprised of an insulating film such as a silicon oxide film, a silicon nitride film, or silicon oxynitride film is formed as a blocking layer. Here, as the base insulating film 1101, a two layer structure (silicon oxynitride film having a thickness of 50 nm, and silicon oxynitride film having a thickness of 100 nm) is taken, but a single layer film or a structure in which two or more layers are layered may be used. Incidentally, in the case where there is no need to provide a blocking layer, the base insulating film may not be formed (FIG. 21A).

Figure 21B:
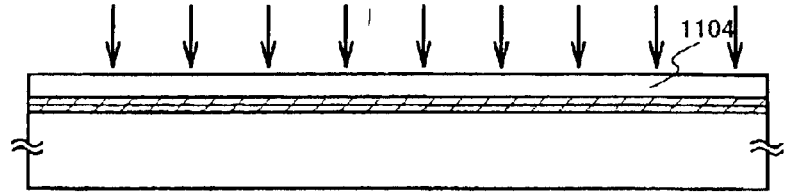

Next, the semiconductor film 1102 having an amorphous structure is crystallized on the base insulating film by well-known means to form a semiconductor film 1104 having a crystalline structure (FIG. 21B).

In this embodiment, as the semiconductor film having the crystalline structure, the semiconductor film 1102 having an amorphous structure obtained by plasma CVD, reduced pressure thermal CVD, or sputtering is crystallized by laser annealing using the laser apparatus of the present invention.

As the laser oscillation apparatus, a gas laser or a solid laser of continuous oscillation or pulse oscillation can be used. As a gas laser, there is an excimer laser, an Ar laser, a Kr laser, or the like. As a solid laser, there is a YAG laser, a YVO$_4$ laser, a YLF laser, a YAlO$_3$ laser, a glass laser, a ruby laser, an alexandrite laser, a Ti: sapphire laser, a Y$_2$O$_3$ laser, or the like. As a solid laser, it is possible to use a laser using crystal such as YAG, YVO$_4$, YLF, or YAlO$_3$ doped with Cr, Nd, Er, Ho, Ce, Co, Ti, Yb or Tm, or the like. A fundamental wave of the laser concerned depends on a doped material and a laser light having the fundamental wave of around 1 $\mu$m is obtained. A harmonic wave with respect to the fundamental wave can be obtained by using a nonlinear optical element. As to the detailed condition of laser light irradiation, the description of Embodiment 9 can be referred to.

Note that it is desirable to form the semiconductor film such that oxygen concentration (SIMS analysis) in the semiconductor film 1104 having the crystalline structure is equal to $5 \times 10^{18}$ atoms/cm$^3$ or lower.

Next, there is formed a barrier layer 1105 mainly containing silicon on the semiconductor film 1104 having the crystalline structure. Note that the barrier layer 1105 may be extremely thin. It may be a natural oxide film or an oxide film which is obtained through oxidization by generating ozone according to ultraviolet ray irradiation under the atmosphere containing oxygen. In addition, as this barrier layer 1105, there may be used an oxide film which is obtained through oxidization by using a solution containing ozone used for surface treatment called hydro-washing which is performed for removing carbon, that is, an organic material. This barrier layer 1105 is mainly used as an etching stopper. Further, after the barrier layer 1105 is formed, channel doping may be performed to conduct activation by irradiating a strong light.

Figure 21C:
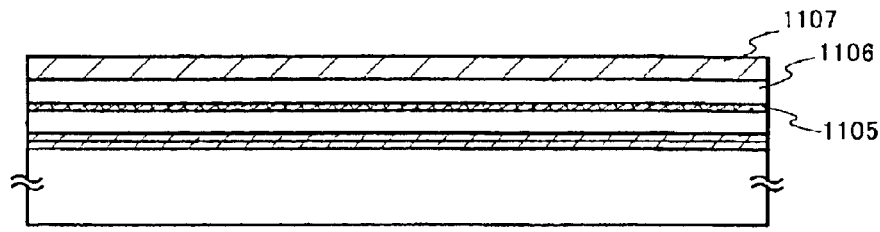

Next, there is formed a second semiconductor film 1106 on the barrier layer 1105 (FIG. 21C). The second semiconductor film 1106 may be a semiconductor film having an amorphous structure or a semiconductor film having a crystalline structure. The thickness of the second semiconductor film 1106 is assumed to be 5 to 50 nm, preferably, 10 to 20 nm. It is desirable that the second semiconductor film 1106 contains oxygen (the concentration according to SIMS analysis is equal to $5 \times 10^{18}$ atoms/cm$^3$ or more, preferably, equal to $1 \times 10^{19}$ atoms/cm$^3$ or more) to thereby improve gettering efficiency.

Figure 21D:
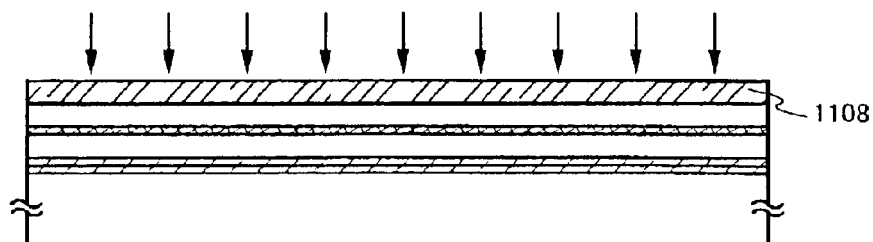

Next, there is formed a third semiconductor film (gettering site) 1107 containing a rare gas element on the second semiconductor film 1106. This third semiconductor layer 1107 may be a semiconductor film having an amorphous structure formed by using plasma CVD, reduced pressure thermal CVD, or sputtering or a semiconductor film having a crystalline structure. The third semiconductor film may be a semiconductor film containing a rare gas element in the process of film formation. Further, the rare gas element may be added after film formation of the semiconductor film which dose not contain the rare gas element. In this embodiment, there is shown a case where after the third semiconductor film 1107 containing the rare gas element in the process of film formation is formed, the rare gas element is further added selectively to form a third semiconductor film 1108 (FIG. 21D). Furthermore, film formation may be consecutively performed without exposing the second semiconductor film and the third semiconductor film to the atmosphere. In addition, a sum of the thickness of the second semiconductor film and the thickness of the third semiconductor film may be 30 to 200 nm, for example, 50 nm.

In this embodiment, the second semiconductor film 1106 makes an interval between the first semiconductor film 1104 and the third semiconductor film (gettering site) 1108. In gettering, an impurity element such as metal existing within the semiconductor film 1104 tends to gather around a boundary of the gettering site, and thus as shown in this embodiment, it is desirable that the boundary of the gettering site is moved away from the first semiconductor film 1104 by the second semiconductor film 1106 to thereby improve the gettering efficiency. Moreover, the second semiconductor film 1106 has the effect of blocking in order to prevent a state where the impurity element contained in the gettering site is diffused to reach an interface of the first semiconductor film at the time of gettering. Further, the second semiconductor film 1106 has the effect of protecting so as not to cause a damage to the first semiconductor film in the case of adding the rare gas element.

Figure 21E:
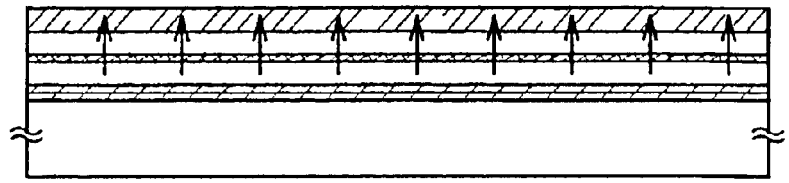

Next, gettering is performed. In the gettering process, heat treatment may be conducted at 450 to 800° C. for 1 to 24 hours, for example, at 550° C. for 14 hours in a nitrogen atmosphere. Further, instead of heat treatment, a strong light may be irradiated. Furthermore, in addition to heat treatment, a strong light may be irradiated. Also, a heated gas may be jetted to heat the substrate. In this case, heat treatment may be performed at 600 to 800° C., more desirably, 650 to 750° C. for 1 to 60 minutes and the processing time can be reduced. Through this gettering, the impurity element is moved in the direction of an arrow in FIG. 21E to remove the impurity element contained in the semiconductor film 1104 covered with the barrier layer 1105 and to reduce the concentration of the impurity element. Here, all the impurity elements are moved to the third semiconductor film 1108 so as not to segragate to the first semiconductor film 1104, and there hardly exist the impurity elements contained in the first semiconductor film 1104. That is, gettering is sufficiently performed such that the impurity element concentration in the film is equal to $1 \times 10^{18}$ atoms/cm$^3$ or lower, desirably, equal to $1 \times 10^{17}$ atoms/cm$^3$ or lower.

Figure 21F:
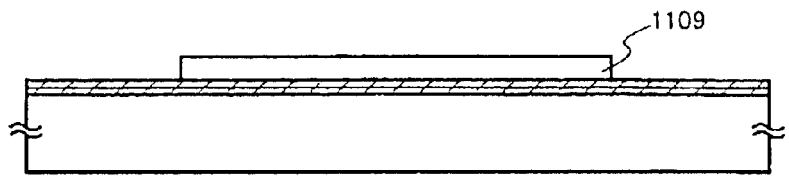

Next, after selectively removing only the semiconductor films shown by reference numerals 1106 and 1108, using the barrier layer 1105 as an etching stopper, there is formed a semiconductor layer 1109 having a desired shape by patterning the semiconductor film 1104 using a well-known patterning technique (FIG. 21F).

Then, after washing the surface of the semiconductor layer using an etchant containing hydrofluoric acid, there is formed an insulating film mainly containing silicon as a gate insulating film 1110. It is desirable to perform this surface washing and formation of the gate insulating film consecutively without being exposed to the atmosphere.

Next, after washing the gate insulating film surface, there is formed a gate electrode 1111. An impurity element for imparting n-type to the semiconductor (P, As, and the like), that is, phosphorus in this case, is appropriately added to form a source region 1112 and a drain region 1113. After adding, heat treatment, irradiation with a strong light, or irradiation with the laser light using the laser apparatus of the present invention is performed in order to activate the impurity element. Further, it is possible to attain recovery from plasma damage to the gate insulating film or plasma damage to the interface between the gate insulating film and the semiconductor layer, simultaneously with the activation. In particular, in the atmosphere at a room temperature to 300° C., it is very effective to activate the impurity element by irradiating the second harmonic wave of the YAG laser from the top surface or the back surface. The YAG laser is preferable activating means because cost of maintenance is low.

Figure 21G:
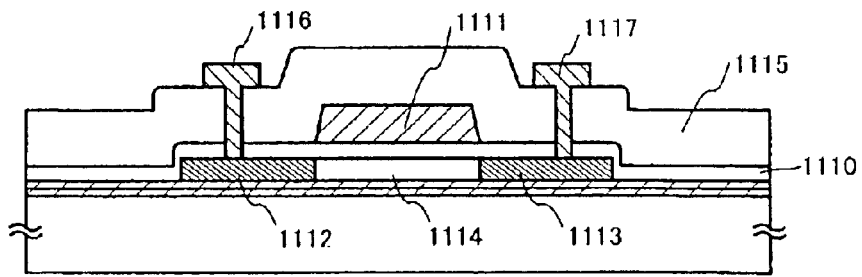

As the subsequent processes, there is formed an interlayer insulating film 1115 to conduct hydrogenation. Then, there is formed a contact hole reaching a source or drain region to form a source electrode 1116 and a drain electrode 1117. Thus, the TFT is completed (FIG. 21G).

In the TFT thus obtained, the impurity element contained at least in the channel forming region 1114 is removed and the rare gas element is not contained.

Further, this embodiment is not limited to the structure of FIGS. 21A to 21G. If necessary, there may be adopted a lightly doped drain (LDD) structure having an LDD region between the channel forming region and the drain region (or the source region). In this structure, between the channel forming region and the source or drain region formed by adding an impurity element at a high concentration, there is provided a region added with an impurity element at a low concentration. This region is called an LDD region. In addition, a so-called GOLD (gate overlapped LDD) structure may be taken in which the LDD region is disposed overlapping the gate electrode through the gate insulating film.

Further, an explanation is made using an n-channel TFT, here, but it is needless to say that a p-channel TFT can be formed by using an impurity element for imparting p-type to the semiconductor instead of an impurity element for imparting n-type to the semiconductor.

Furthermore, in this embodiment, the semiconductor film is patterned after gettering is completed, but this embodiment is not limited to this structure. Patterning of the semiconductor film may be performed before crystallization or may be performed before forming the barrier layer further after crystallization. Also, before crystallizing the semiconductor film, or before forming the barrier layer after crystallization, patterning may be roughly performed, and then after gettering, patterning may be performed again to form the active layer of the TFT.

Furthermore, an explanation is made here using a top gate TFT as an example, but it is possible to apply this embodiment irrespective of the TFT structure. For example, it is possible to apply this embodiment to a bottom gate (inverse stagger) TFT or a forward stagger TFT.

Note that it is possible to implement the structure of this embodiment freely combined with Embodiments 1 to 13.

(Embodiment 15)

Given as examples of electric equipment employing a semiconductor device formed by the laser apparatus of the present invention is applied are: a video camera; a digital camera; a goggle type display (head mounted display); a navigation system; an audio reproducing device (car audio, an audio component, and the like); a laptop computer; a game machine; a portable information terminal (a mobile computer, a cellular phone, a portable game machine, an electronic book, etc.); and an image reproducing device including a recording medium (specifically, a device equipped with a display device which can reproduce a recording medium such as a digital versatile disk (DVD), and can display the image). Specific embodiments of the electric equipment are shown in FIGS. 22A to 22H.

Figure 22A:
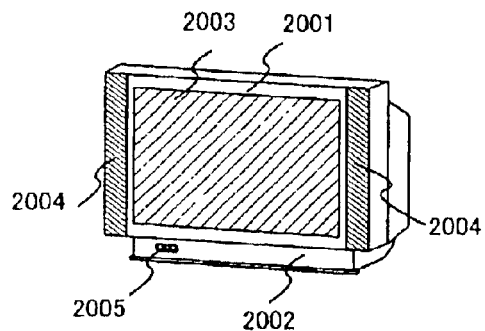
FIGS. 22A to 22H are diagrams showing electronic equipment using the semiconductor device formed by the laser apparatus of the present invention.

FIG. 22A shows a display device, which comprises a casing 2001, a supporting base 2002, a display portion 2003, speaker portions 2004, a video input terminal 2005, etc. The semiconductor device formed by the present invention is applied can be used for the display portion 2003. The semiconductor device is self-luminous and does not need a backlight, so that it can make a thinner display portion than liquid display devices can. The term display device includes every display device for displaying information such as one for a personal computer, one for receiving TV broadcasting, and one for advertisement.

Figure 22B:
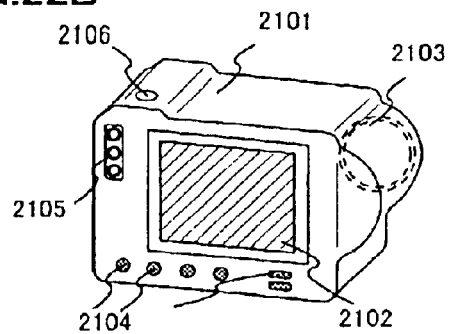

FIG. 22B shows a digital still camera, which comprises a main body 2101, a display portion 2102, an image receiving portion 2103, operation keys 2104, an external connection port 2105, a shutter 2106, etc. The semiconductor device formed by the present invention is applied can be used for the display portion 2102 and other circuits.

Figure 22C:
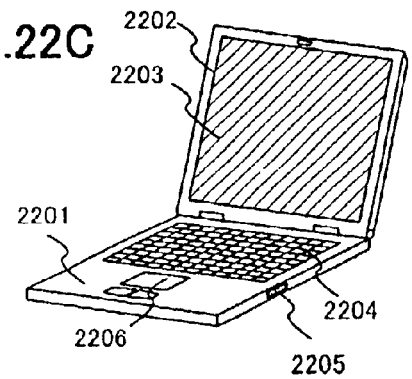

FIG. 22C shows a laptop computer, which comprises a main body 2201, a casing 2202, a display portion 2203, a keyboard 2204, an external connection port 2205, a pointing mouse 2206, etc. The semiconductor device formed by the present invention is applied can be used for the display portion 2203 and other circuits.

Figure 22D:
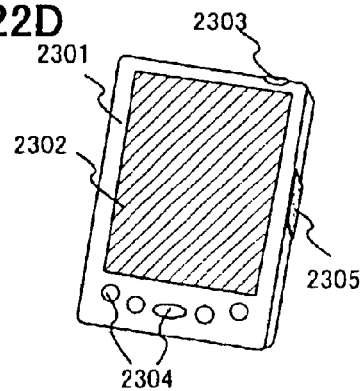

FIG. 22D shows a mobile computer, which comprises a main body 2301, a display portion 2302, a switch 2303, operation keys 2304, an infrared ray port 2305, etc. The semiconductor device formed by the present invention is applied can be used for the display portion 2302.

Figure 22E:
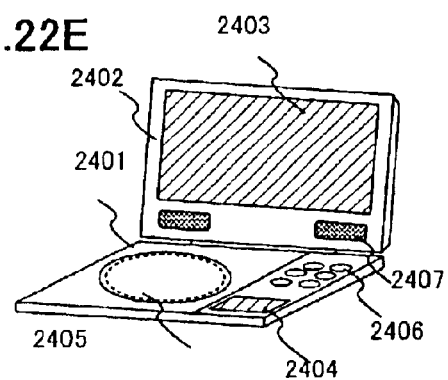

FIG. 22E shows a portable image reproducing device equipped with a recording medium (a DVD player, to be specific). The device comprises a main body 2401, a casing 2402, a display portion A 2403, a display portion B 2404, a recording medium (DVD or the like) reading portion 2405, operation keys 2406, speaker portions 2407, etc. The display portion A 2403 mainly displays image information whereas the display portion B 2404 mainly displays text information. The semiconductor device formed by the present invention is applied can be used for the display portions A 2403, the display portion B 2404, and the other circuits. Note that, the term image reproducing device equipped with a recording medium includes domestic game machines.

Figure 22F:
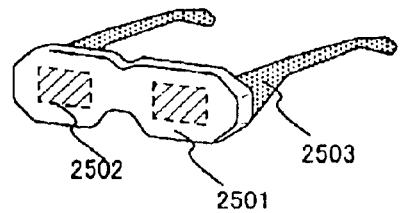

FIG. 22F shows a goggle type display (head mounted display), which comprises a main body 2501, display portions 2502, and arm portions 2503. The semiconductor device formed by the present invention is applied can be used for the display portions 2502 and the other circuits.

Figure 22G:
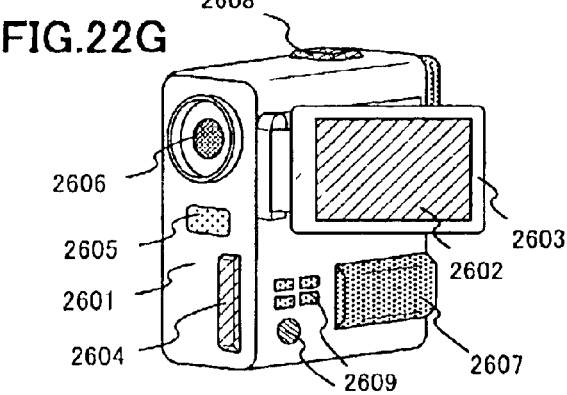

FIG. 22G shows a video camera, which comprises a main body 2601, a display portion 2602, a casing 2603, an external connection port 2604, a remote control receiving portion 2605, an image receiving portion 2606, a battery 2607, an audio input portion 2608, operation keys 2609, etc. The semiconductor device formed by the present invention is applied can be used for the display portion 2602 and the other circuits.

Figure 22H:
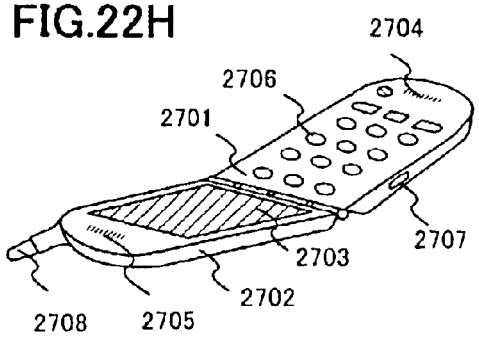

FIG. 22H shows a cellular phone, which comprises a main body 2701, a casing 2702, a display portion 2703, an audio input portion 2704, an audio output portion 2705, operation keys 2706, an external connection port 2707, an antenna 2708, etc. The semiconductor device formed by the present invention is applied can be used for the display portion 2703 and the other circuits. If the display portion 2703 displays white characters on a black background, power consumption of the cellular phone can be reduced.

Note that, in addition to the above mentioned electronic equipments, a front type of rear type projector can be used.

As described above, the application range of the present invention is applied is very wide and electric equipment in various field can employ the device. The electric equipments in this embodiment may use the semiconductor device formed in Embodiments 1 to 14.

(Embodiment 16)

In this embodiment, there is described a case where the semiconductor film is crystallized using the laser apparatus of the present invention.

Figure 23A:
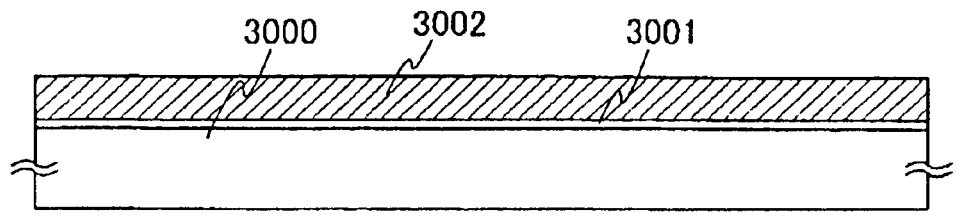
FIGS. 23A to 23D are diagrams showing a crystallizing method for a semiconductor film using the laser apparatus of the present invention.

In FIG. 23A, reference numeral 3000 denotes a substrate having an insulating surface, and 3001 denotes a base film as an insulating film which prevents the impurity within the substrate from entering the semiconductor film. 3002 denotes a semiconductor film having an amorphous structure.

In FIG. 23A, as the substrate 3000, there can be used a glass substrate, a quartz substrate, a ceramic substrate, or the like. Further, the substrate in which an insulating film is formed on the surface of a silicon substrate, a metal substrate, or a stainless steel substrate may be used. Further, a plastic substrate having heat resistance that can withstand the processing temperature of this process may be used.

First, as shown in FIG. 23A, the base insulating film 3001 comprised of an insulating film such as silicon oxide film, silicon nitride film, silicon oxynitride film($SiO_xN_y$), or the like is formed on the substrate 3000. For a typical example, there may be used, as the base insulating film 3001, a two layer structure in which a first silicon oxynitride film which is formed using $SiH_4$, $NH_3$, and $N_2O$ as a reaction gas and has a thickness of 30 to 100 nm, and a second silicon oxynitride film which is formed using $SiH_4$ and $N_2O$ as a reaction gas and has a thickness of 30 to 150 nm are layered. Also, there may be adopted a three layer structure in which the first silicon oxynitride film, the second silicon oxynitride film, and a silicon nitride film are layered in order.

Then, the semiconductor film 3002 having an amorphous structure is formed on the base insulating film 3001. As the semiconductor film 3002, a semiconductor material mainly containing silicon is used. Typically, there is applied an amorphous silicon film, an amorphous silicon germanium film, or the like. The film is formed to have a thickness of 10 to 100 nm by using plasma CVD, reduced pressure CVD, or sputtering. In order to obtain a semiconductor film having a satisfactory crystalllinity in the later crystallization, the concentration of impurities such as oxygen and nitrogen contained in the semiconductor film 3002 having the amorphous structure may be reduced to $5\times10^{18}$ atoms/cm$^3$ (atomic concentration measured by secondary ion mass spectroscopy (SIMS)) or lower. These impurities may be a factor in disturbing the later crystallization, or may be a factor in increasing a density of a trap center or a recombination center also after crystallization. Therefore, in addition to use of a high purity material gas, it is desirable to use a CVD apparatus capable of adapting to ultra-high vacuum, provided with a reaction chamber which is subjected to a mirror finish (electrolytic polishing processing) or an oil-free vacuum exhausting system.

Next, in an atmosphere or an oxygen atmosphere, the semiconductor film 3002 having the amorphous structure is irradiated with a first laser light using the laser apparatus of the present invention to be crystallized. In this embodiment, as the first laser, a $YVO_4$ laser of continuous oscillation is used. In this embodiment, it is assumed that an output energy of the laser light is 27 W and a beam spot of the laser is an ellipse of 500 μm×50 μm (major axis×minor axis) in shape. Then, the laser light is moved in the direction of the minor axis of the ellipse. Note that the output energy of the laser light and the shape of the beam spot can be arbitrarily set by a designer.

Note that the $YVO_4$ laser of continuous oscillation is used in this embodiment, but this embodiment is not limited to this structure. For example, as the laser oscillation apparatus, an excimer laser, a YAG laser, or a $YVO_4$ laser of pulse oscillation or continuous oscillation can be used. The condition of crystallization is arbitrarily selected by a performer, but in the case of using the excimer laser, it is assumed that the pulse oscillation frequency is 300 Hz and the laser energy density is 100 to 400 mJ/cm$^2$ (typically, 200 to 300 mJ/cm$^2$). Also, in the case of using the YAG laser, by using the second harmonic wave thereof, it may be assumed that the pulse oscillation frequency is 30 to 300 kHz and the laser energy density is 300 to 600 mJ/cm$^2$ (typically, 350 to 500 mJ/cm$^2$). Then, the laser light linearly condensed, whose width is 100 to 1000 μm, for example, 400 μm, is irradiated on the overall surface of the substrate. Overlap ratio of the linear laser light at this time is assumed to be 50 to 90%.

Note that as a laser, a gas laser or a solid laser of continuous oscillation or pulse oscillation can be used. As a gas laser, there is an excimer laser, an Ar laser, a Kr laser, or the like. As a solid laser, there is a YAG laser, a $YVO_4$ laser, a YLF laser, a $YAlO_3$ laser, a glass laser, a ruby laser, an alexandrite laser, a Ti: sapphire laser, a $Y_2O_3$ laser, or the like. As a solid laser, it is possible to use a laser using crystal such as YAG, $YVO_4$, YLF, or $YAlO_3$ doped with Cr, Nd, Er, Ho, Ce, Co, Ti, Yb or Tm, or the like. A fundamental wave of the laser concerned differs depending on a doped material and a laser light having the fundamental wave of around 1 μm is obtained. A harmonic wave with respect to the fundamental wave can be obtained by using a nonlinear optical element.

In crystallization of the amorphous semiconductor film, in order to obtain crystal having a large grain size, it is preferable to use a solid laser capable of continuous oscillation and apply the second to fourth harmonic waves of the fundamental wave thereto. Typically, it is desirable to apply the second harmonic wave (532 nm) and the third harmonic wave (355 nm) of Nd:YVO$_4$ laser (fundamental wave 1064 nm) thereto. More specifically, the laser light emitted from the YVO$_4$ laser of continuous oscillation whose output is 10 W is converted to the harmonic wave by the nonlinear optical element. Further, there is a method in which YVO$_4$ crystal and the nonlinear optical element are put in a resonator to emit the harmonic wave. Then, preferably, the laser light is formed into a rectangular or elliptic laser light on the irradiation surface by the optical system and is irradiated onto the object to be processed. The energy density at this time needs to be approximately 0.01 to 100 MW/cm$^2$ (preferably, 0.1 to 10 MW/cm$^2$). Then, irradiation is conducted by moving the semiconductor film relatively to the laser light at the speed of about 10 to 2000 cm/s.

Figure 23B:
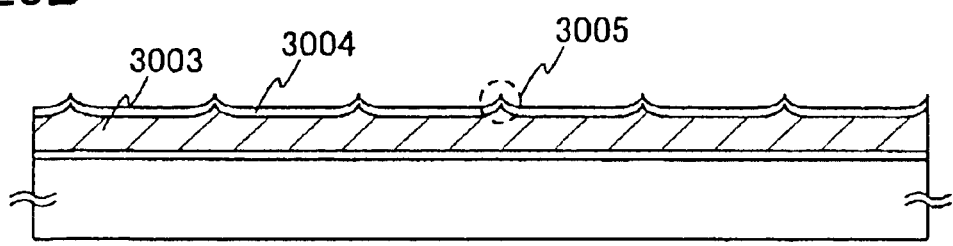

Through laser light irradiation, the semiconductor film 3002 having the amorphous structure is crystallized to form a semiconductor film 3003 having crystallinity and an oxide film 3004 in contact with the semiconductor film 3003. Note that, in the case of laser light irradiation, there is formed a projecting portion (ridge) 3005 along a grain boundary of the semiconductor film 3003 (FIG. 23B).

Next, the oxide film 3004 is removed. In this embodiment, the oxide film 3004 is removed using a hydrofluoric acid-based etching solution to expose the surface of the semiconductor film 3003 having crystallinity. Note that the way of removing the oxide film 3004 is not limited to the above-mentioned method. For example, the oxide film 3004 may be removed by using a fluorine-based gas.

Figure 23C:
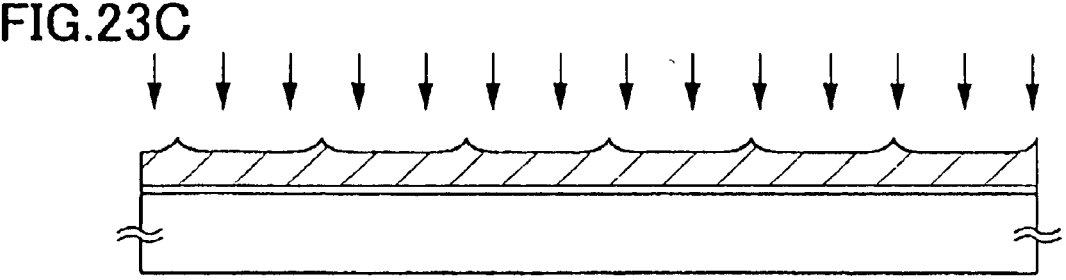
Figure 24A:
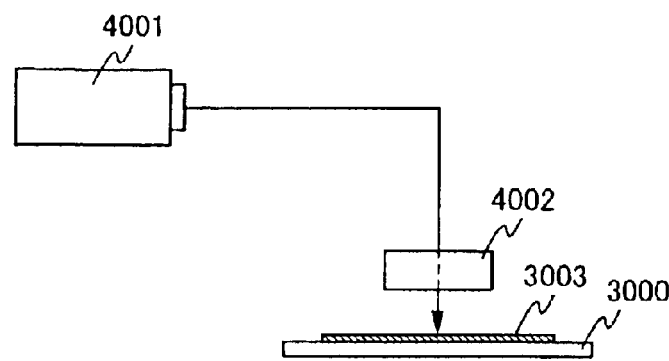
FIGS. 24A and 24B are diagrams showing an embodiment of the laser apparatus of the present invention.
Figure 24B:
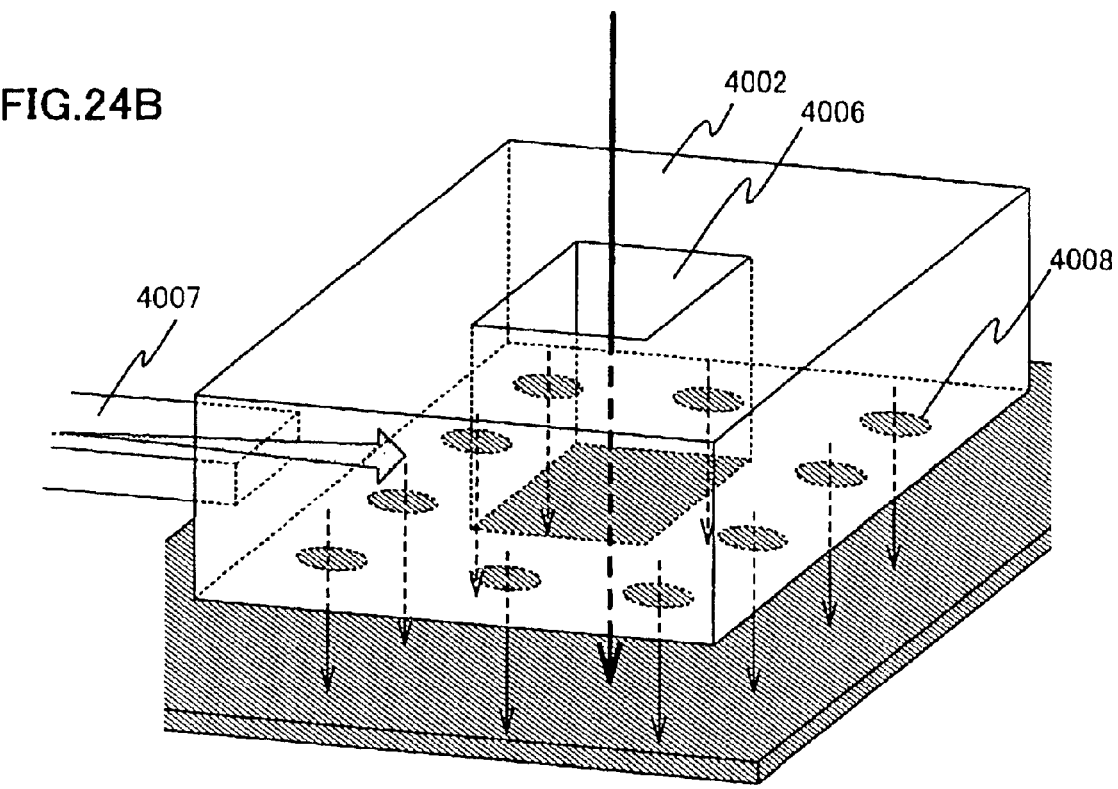

Then, the laser light (second laser light) is irradiated on the semiconductor film 3003 having crystallinity under a nitrogen or vacuum atmosphere (FIG. 23C). Note that, in the case where the second laser light is irradiated under an inert atmosphere, for example, as shown in FIGS. 24A and 24B, an inert gas may be applied only onto the portion of the semiconductor film 3003 where the laser light is irradiated. For example, as shown in FIG. 24A, a laser light outputted from the laser oscillation apparatus and an optical system 4001 may be irradiated on the semiconductor film 3003 by passing through a slit of a gas spraying portion 4002. FIG. 24B is an enlarged view of the gas spraying portion 4002. The gas spraying portion 4002 is provided with a silt 4006 through which the laser light can pass. Further, the gas spraying portion 4002 is provided with an opening portion 4008 in which an inert gas supplied through a pipe 4007 can be jetted to the periphery of a portion of the semiconductor film 3003 where the laser light is irradiated. The inert gas jetted from the opening portion 4008 is sprayed onto the semiconductor film 3003.

Figure 23D:
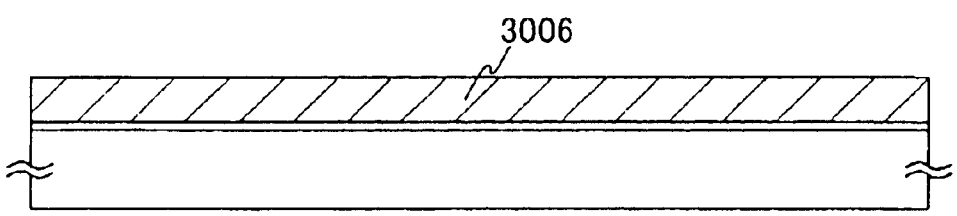

In the case where the laser light (second laser light) is irradiated in the second laser irradiation, there is reduced a peak to valley value (P-V value: difference between the maximum value and the minimum value of height) of unevenness formed through the first laser light irradiation. That is, a leveled semiconductor film 3006 is formed (FIG. 23D). Here, the P-V value of the unevenness may be observed by an AFM (atomic force microscopy). More specifically, when the P-V value of the unevenness of the surface formed through the first laser light irradiation is, for example, approximately 10 nm to 30 nm, it is possible to reduce the P-V value of the unevenness of the surface to 5 nm or lower through the second laser light irradiation.

As this laser light (second laser light), there is used an excimer laser light whose wavelength is equal to 400 nm or lower, or a second harmonic wave or a third harmonic wave of a YAG laser. Further, the same laser as the above-mentioned first laser light may be used.

Note that, although in the second laser light irradiation, the energy density is higher than that of the first laser light, crystallinity hardly changes before and after the irradiation. Further, crystal condition such as grain size hardly changes. That is, it is considered that only the leveling is performed in this second laser light irradiation.

A merit that the semiconductor film 3006 having crystallinity is leveled by the second laser light irradiation is extremely large. More specifically, levelness is improved to thereby make a gate insulating film to be formed later thin. As a result, it is possible to improve an ON-current value of the TFT. Furthermore, levelness is improved, whereby OFF-current can be reduced in the case of manufacturing the TFT.

It is possible to implement this embodiment combined with Embodiments 1 to 15.

(Embodiment 17)

In this embodiment, there is described a case where the process of crystallizing the semiconductor film by laser annealing using the laser apparatus of the present invention is applied to a manufacturing method for an active matrix semiconductor display device having a driving circuit on the same substrate of a pixel portion.

Figure 25A:
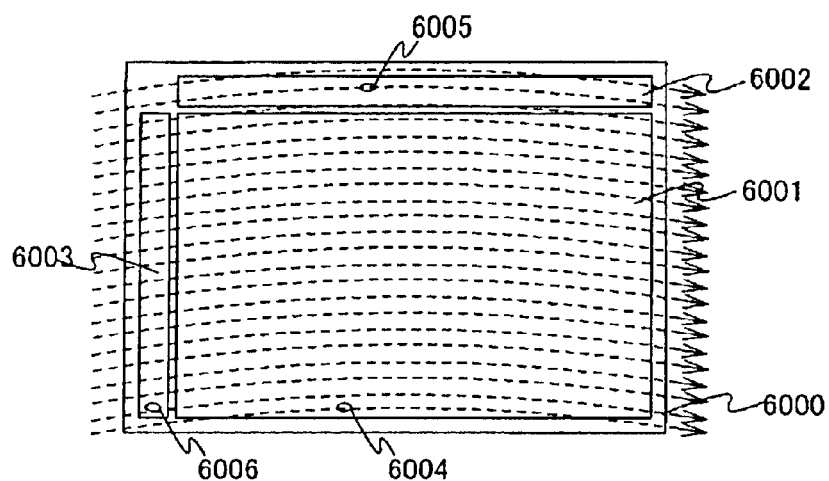
FIGS. 25A to 25D are diagrams showing a locus of the laser light in the liquid crystal panel.

FIG. 25A is a top view of a liquid crystal panel provided with a pixel portion 6001, a signal line driving circuit 6002, and a scanning line driving circuit 6003 on a substrate 6000. In FIG. 25A, the irradiation position of the laser light is moved in the direction of an arrow shown by a broken line.

When the laser light is irradiated on the semiconductor film by the laser apparatus of the present invention, a locus of the laser light does not draw a complete straight line but draws a gentle arc. Therefore, when the semiconductor film is crystallized by using the laser apparatus of the present invention, a trace of irradiation with the laser light is formed in an arc shape on the semiconductor film. Note that these arcs have substantially the same radius of curvature. However, the size of the active layer of the TFT formed by patterning the semiconductor film is small in comparison with the radius of the arc, and thus, even if the trace of irradiation with the laser light of each active layer is left, the trace of irradiation is substantially linear-shaped.

Figure 25B:
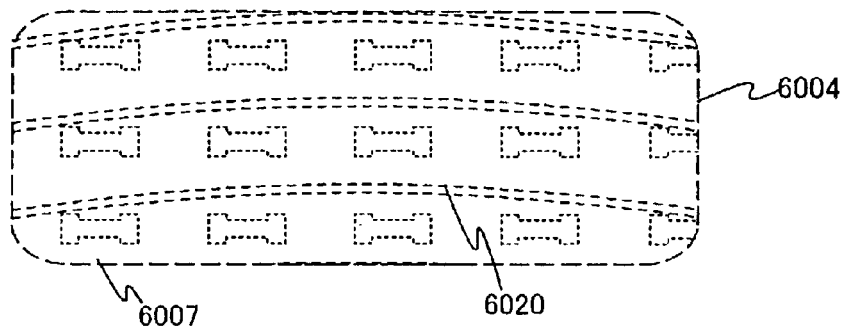
Figure 25C:
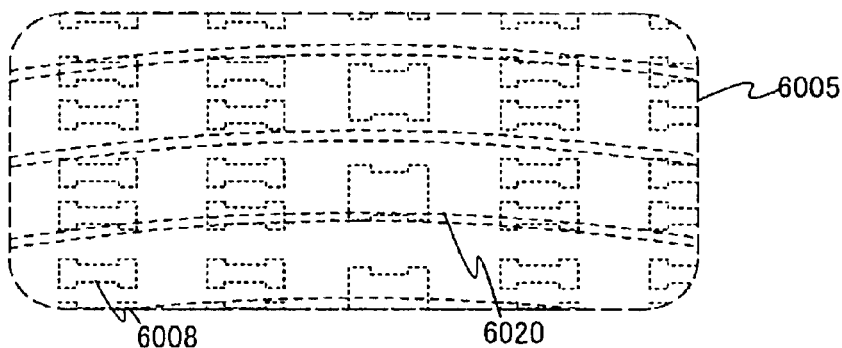
Figure 25D:
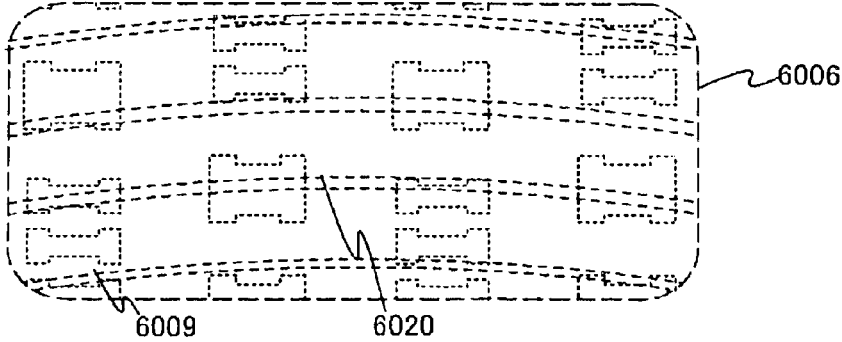

FIG. 25B is an enlarged view of a portion 6004 of the pixel portion 6001 of FIG. 25A. FIG. 25C is an enlarged view of a portion 6005 of the signal line driving circuit 6002 of FIG. 25A. FIG. 25D is an enlarged view of a portion 6006 of the scanning line drive circuit 6003 of FIG. 25A.

A plurality of island-like semiconductor films as the active layer of each TFT are formed in the pixel portion 6001, the signal line driving circuit 6002, and the scanning line driving circuit 6003, respectively. Reference numerals 6007, 6008, and 6009 denote a portion which becomes the active layer of the TFT after patterning. A broken line 6020 denotes a trace of irradiation with the laser light.

The trace of irradiation with the laser light 6020 substantially follows the direction of the carrier moving or the reverse direction thereof.

It is possible to implement this embodiment combined with Embodiments 1 to 16.

According to the laser apparatus of the present invention, even if the laser light is irradiated from a definite position and a definite direction, it is possible to move the irradiation position of the laser light on the object to be processed in X direction and Y direction without changing the moving direction of the object to be processed, and to irradiate the overall surface of the object to be processed with the laser light. Accordingly, there is caused no loss of time according to the change of the moving direction of the object to be processed and it is possible to enhance the processing efficiency in comparison with the conventional example.

Further, in the laser light, the irradiation angle with respect to the object to be processed is fixed irrespective of the irradiation position, whereby it is possible to prevent intensity of beam which returns by reflecting on the object to be processed, intensity of interference and the like from differing depending on the irradiation position and to substantially uniformly treat the object to be processed. For example, in the case where the semiconductor film is crystallized by laser irradiation, it is possible to prevent a difference from being caused in crystallinity depending on the position of the semiconductor film. In addition, it is possible to simplify the optical system in comparison with the case where the object to be processed in whole is irradiated with the laser light by changing the irradiation direction of the beam.

What is claimed is:

1. A laser apparatus comprising:
a laser oscillation apparatus;
means for rotating an object to be processed;
means for moving the object to be processed toward a center of the rotation or toward an outside from the center; and
means for directing a laser light to a definite region in a moving range of the object to be processed,
wherein the object to be processed is moved toward the center of the rotation or toward the outside from the center to a position where the definite region and the object to be processed overlap while the object to be processed is rotated.

2. A laser apparatus according to claim 1, wherein the laser oscillation apparatus is a solid laser of continuous oscillation apparatus.

3. A laser apparatus according to claim 1, wherein the laser oscillation is at least one continuous oscillation apparatus selected from the group consisting of YAG laser, a $YVO_4$ laser, a YLF laser, a $YAlO_3$ laser, a glass laser, a ruby laser, an alexandrite laser, a Ti: sapphire laser, and a $Y_2O_3$ laser.

4. A laser apparatus according to claim 1, wherein the laser oscillation apparatus oscillates an excimer laser, an Ar laser, or a Kr laser of pulse and/or continuous oscillation apparatus.

5. A laser apparatus according to claim 1, wherein the laser light is a second harmonic wave.

6. A laser apparatus comprising:
a laser oscillation apparatus;
means for rotating a plurality of objects to be processed on an identical plane;
means for moving the plurality of objects to be processed toward a center of the rotation or toward an outside from the center; and
means for directing a laser light to a definite region in a moving range of the object to be processed,
wherein:
the center of the rotation of the plurality of objects to be processed is the one identical center; and
the plurality of objects to be processed are moved toward the center of the rotation or toward the outside from the center to a position where the definite region and the plurality of objects to be processed overlap while the plurality of objects to be processed are rotated.

7. A laser apparatus according to claim 6, wherein the laser oscillation apparatus is a solid laser of continuous oscillation apparatus.

8. A laser apparatus according to claim 6, wherein the laser oscillation is at least one continuous oscillation apparatus selected from the group consisting of YAG laser, a $YVO_4$ laser, a YLF laser, a $YAlO_3$ laser, a glass laser, a ruby laser, an alexandrite laser, a Ti: sapphire laser, and a $Y_2O_3$ laser.

9. A laser apparatus according to claim 6, wherein the laser oscillation apparatus oscillates an excimer laser, an Ar laser, or a Kr laser of pulse and/or continuous oscillation apparatus.

10. A laser apparatus according to claim 6, wherein the laser light is a second harmonic wave.

11. A laser apparatus according to claim 1, wherein the laser apparatus further comprises means for processing the laser light outputted from the laser oscillation apparatus.

12. A laser apparatus according to claim 6, wherein the laser apparatus further comprises means for processing the laser light outputted from the laser oscillation apparatus.

* * * * *